United States Patent
Albrecht

(10) Patent No.: US 11,384,324 B2
(45) Date of Patent: Jul. 12, 2022

(54) RECONDITIONED OR INFUSED FLUID CONTAINERS AND RELATED METHODS

(71) Applicant: ALBRECHT HOLDINGS LLC, Buxton, ME (US)

(72) Inventor: Matthew R. Albrecht, Buxton, ME (US)

(73) Assignee: ALBRECHT HOLDINGS LLC, Buxton, ME (US)

( * ) Notice: Subject to any disclaimer, the term of this patent is extended or adjusted under 35 U.S.C. 154(b) by 300 days.

(21) Appl. No.: 15/051,218

(22) Filed: Feb. 23, 2016

(65) Prior Publication Data

US 2016/0243599 A1 Aug. 25, 2016

Related U.S. Application Data

(60) Provisional application No. 62/120,025, filed on Feb. 24, 2015.

(51) Int. Cl.
*C12H 1/22* (2006.01)
*B08B 9/08* (2006.01)
(Continued)

(52) U.S. Cl.
CPC .............. *C12H 1/22* (2013.01); *B08B 9/0813* (2013.01); *B65D 9/04* (2013.01); *B65D 39/0041* (2013.01);
(Continued)

(58) Field of Classification Search
CPC ................................ B08B 9/00; B08B 9/0813
See application file for complete search history.

(56) References Cited

U.S. PATENT DOCUMENTS

| 144,103 A | 10/1873 | Jenkins |
| 305,705 A | 9/1884 | Mueller |

(Continued)

FOREIGN PATENT DOCUMENTS

| CN | 202 295 656 U | 7/2012 |
| CN | 104690043 A | 6/2015 |

(Continued)

OTHER PUBLICATIONS

U.S. Pat. No. 686,772; Nov. 19, 1901.*
(Continued)

*Primary Examiner* — Stephanie A Cox
(74) *Attorney, Agent, or Firm* — Preti Flaherty Beliveau & Pachios LLP

(57) ABSTRACT

The invention features a method of reconditioning a fluid container including heating for at least one cycle the fluid container to a select temperature for a select time duration; sealing for at least one cycle the fluid container; cooling for at least one cycle the fluid container to a select vacuum for a select time duration in an interior of the fluid container; wherein the select vacuum and the select time duration of the cooling step are selected to draw substantially a fluid from at least one of a pore, a cell and a fiber of the fluid container to a surface of the fluid container. The invention also features methods of infusing an infusion agent into a reconditioned fluid container, and methods for preparing construction materials, devices adapted for the construction material preparation methods, and construction materials including wood reconditioned and prepared in accordance with the methods of the invention.

25 Claims, 20 Drawing Sheets

(51) Int. Cl.
  *B65D 71/00* (2006.01)
  *B65D 39/00* (2006.01)
  *B65D 8/00* (2006.01)
  *C12G 3/07* (2006.01)
  *B08B 3/02* (2006.01)
  *B26D 7/02* (2006.01)

(52) U.S. Cl.
  CPC .......... *B65D 71/0092* (2013.01); *C12G 3/07* (2019.02); *B08B 3/028* (2013.01); *B26D 7/02* (2013.01); *B65D 2571/00043* (2013.01); *B65D 2571/00061* (2013.01); *Y02A 40/90* (2018.01)

(56) References Cited

U.S. PATENT DOCUMENTS

| | | | |
|---|---|---|---|
| 686,772 A * | 11/1901 | Seltzer | |
| 1,328,658 A | 1/1920 | Fish, Jr. | |
| 2,943,940 A | 7/1960 | Wiedemann | |
| 4,587,875 A | 5/1986 | Deley | |
| 4,622,091 A | 11/1986 | Letterman | |
| 5,271,161 A | 12/1993 | Brinck, II | |
| 5,481,960 A * | 1/1996 | Sullivan | C12G 3/065 426/112 |
| 6,235,346 B1 | 5/2001 | Barnisin, Jr. | |
| 6,426,118 B2 | 7/2002 | Barnisin, Jr. | |
| 6,641,927 B1 | 11/2003 | Honary | |
| 6,898,834 B1 * | 5/2005 | Warren | C12G 3/065 29/401.1 |
| 7,273,576 B2 | 9/2007 | White | |
| 7,357,069 B1 | 4/2008 | Karasch et al. | |
| 7,413,694 B2 | 8/2008 | Waldrop, III et al. | |
| 8,181,408 B1 | 5/2012 | Triglia | |
| 8,220,509 B1 | 7/2012 | McLeod | |
| 8,356,989 B2 | 1/2013 | Waldrop et al. | |
| 8,898,998 B1 | 12/2014 | Triglia, Jr. | |
| 2003/0140951 A1 | 7/2003 | Beard | |
| 2003/0186035 A1 | 10/2003 | Cruce et al. | |
| 2006/0191424 A1 | 8/2006 | McLoughlin et al. | |
| 2008/0028942 A1 | 2/2008 | Kania et al. | |
| 2008/0102179 A1 | 5/2008 | Rogers | |
| 2011/0014336 A1 | 1/2011 | Swart et al. | |
| 2012/0064805 A1 | 3/2012 | Brunateau et al. | |
| 2013/0312874 A1 | 11/2013 | Kimble | |
| 2014/0044837 A1 | 2/2014 | Weisman et al. | |
| 2014/0081580 A1 | 3/2014 | Kim et al. | |
| 2014/0326143 A1 | 11/2014 | McCrea | |
| 2015/0017297 A1 | 1/2015 | Vastardis et al. | |

FOREIGN PATENT DOCUMENTS

| | | |
|---|---|---|
| DE | 2919106 A1 | 12/1980 |
| EP | 1405703 B1 | 3/2005 |
| EP | 2732019 B1 | 10/2015 |
| FR | 2736923 A1 | 1/1997 |
| GB | 2110196 B | 10/1985 |
| JP | 02-116376 A | 5/1990 |
| JP | 03-259719 A | 11/1991 |
| JP | 08-57067 A | 3/1996 |
| JP | 8-108406 A | 4/1996 |
| JP | 8-155912 A | 6/1996 |
| JP | 2005-233509 B2 | 9/2005 |
| JP | 2006347160 A | 12/2006 |
| JP | 2008254336 B2 | 10/2008 |
| JP | 2012-214245 A | 11/2012 |
| WO | WO 01/07178 | 2/2001 |
| WO | 2005/007310 A1 | 1/2005 |
| WO | WO 2007/138449 A2 | 12/2007 |
| WO | WO 2013/106071 | 7/2013 |

OTHER PUBLICATIONS

Partial Supplementary European Search Report, dated Aug. 28, 2018, for counterpart EP Application No. 16756191.9, filed Feb. 23, 2016.
Extended European Search Report, dated Dec. 11, 2018, for counterpart EPO Application No. 16756191.9, filed on Feb. 26, 2016.
Office Action by the Chinese Patent Office for CN 2016/80022620.2, dated Mar. 22, 2019. Cited references in Roman characters.
Japanese Office Action, dated Dec. 24, 2019, from related Japanese Application No. 2017-562962, filed Aug. 18, 2017; with English translation.
Japanese Examined Utility Model Registration Application Publication, Jitsukou, No. 030375, Application: Jul. 22, 1926; Notice: Oct. 25, 1926.
Microfilm of Japanese Utility Model Registration Application, Jitsugansho, No. 60-181659 (Japanese Unexamined Utility Model Registration Application Publication, Jitsukaisho No. 62-089598; Published Jun. 8, 1987.
Yang Yixiang et al. "Wine Tasting Encyclopedia", Tianjin Science and Technology Press, pp. 53-56, Sep. 9, 2014, first Edition.

* cited by examiner

250

Cutting at least one stave having a first length and a first width and a first depth along the first length at a select depth thereby forming at least a first cut stave and a second cut stave each having the first length and the first width and a cut second depth, and an uncut first side and rough cut second side
252

Planing at least one rough cut second side to form a substantially smooth cut second side adapted for construction and having a select finished depth
254

Trimming at least one edge of at least one stave thereby forming a trimmed edge
256

Substantially finely trimming at least one of the edge and the trimmed edge of at least one stave thereby forming a finely trimmed edge
258

Planing at least one of an edge, a trimmed edge, and a finely trimmed edge of at least one stave
260

Taping together a plurality of staves
262

Steaming the staves being taped
264

*FIG. 12*

RECONDITIONED OR INFUSED FLUID CONTAINERS AND RELATED METHODS

STATEMENT REGARDING FEDERALLY SPONSORED RESEARCH OR DEVELOPMENT

N/A

BACKGROUND OF THE INVENTION

Fluid containers, such as wooden barrels, which have been used to store fluids particularly over time have unique properties including, for non-limiting examples, aroma, stain, coloration, patina, and weathered or aged wood. They also may include fluid trapped within the pores, cells and/or fibers of the fluid container. Cleaning of such containers in an efficient manner is desirable particularly where any trapped fluids may interfere with the taste, aroma, or other properties of fluids added to the fluid container following container cleaning. In addition, it may be desirable to infuse the fluid container with a selected infusion agent to introduce, for non-limiting examples, a flavor or aroma to fluid added to the container, or to induce a chemical reaction further added fluids. Furthermore, it may be desirable to recapture the used fluid containers as construction materials where their original properties such as color and/or discoloration, patina and even aroma are provide desired aesthetic effects. In such applications, it is desirable to recapture as much wood as possible from the fluid container.

BRIEF SUMMARY OF THE INVENTION

The invention provides reconditioned fluid containers; infused fluid containers; infused, reconditioned fluid containers; reconditioned wood from wooden barrels; reconditioned and/or infused products including preferably wooden reconditioned and/or infused products; and devices and methods or processes related to the reconditioning and/or infusing of fluid containers including used fluid containers such as, for example, wooden barrels, wherein the used wooden barrels can have previously contained alcohols including, for example, whiskey, beer, and other spirits.

In one aspect, the invention features a method of reconditioning a fluid container including the steps of heating for at least one cycle the fluid container to a select temperature for a select time duration; sealing for at least one cycle the fluid container; cooling for at least one cycle the fluid container to a select vacuum for a select time duration in an interior of the fluid container; wherein the select vacuum and the select time duration of the cooling step are selected to draw substantially a fluid from at least one of a pore, a cell and a fiber of the fluid container to a surface of the fluid container.

In one embodiment, the select vacuum and the select time duration of the cooling step are selected to vaporize the fluid drawn to the surface of the fluid container.

In one embodiment, the sealing step includes inserting a specialized stopper into an opening of the fluid container.

In one embodiment, the specialized stopper has a second end adapted for reversibly connecting to at least one of a pressure gauge; a temperature gauge; a device adapted for passing at least one of a working fluid and an infusion agent; a sealing device; and a screen adapted for containing a product capable of burning.

In one embodiment, the method further includes unsealing for at least one cycle the fluid container; and substantially draining for at least one cycle at least one of the fluid drawn to the surface of the fluid container and a working fluid from an interior of the fluid container.

In one embodiment, the method further includes substantially drying for at least one cycle the fluid container with a working fluid including a drying fluid.

In one embodiment, the method further includes pulling a working fluid including a remaining fluid from an interior of the fluid container thereby pulling a select vacuum inside the fluid container for a select time period.

In one embodiment, the method further includes maintaining an interior of the fluid container at a minimum temperature.

In one embodiment, the method further includes infusing an infusion agent into at least one of a pore, a cell and a fiber of the fluid container. In another embodiment, the infusion agent includes at least one of an alcohol component, a fruit component, a fruit concentrate component, a coffee component, a tea component, an herb component, a synthetic flavoring component, a natural flavoring component, and a combination of at least two of the aforementioned components.

In one embodiment, the method further includes passing a select amount of a working fluid including a pressurizing fluid into the fluid container thereby pressurizing the fluid container at a select pressure for a select time duration.

In one embodiment, the method further includes laying a plurality of staves of the fluid container in at least a first layer and a second layer disposed above the first layer thereby forming a preliminary stack; applying a select pressure to the preliminary stack to form a stack under tension; steaming the stack under tension for select time duration thereby at least in part flattening the staves; heating the stack under tension for a select time duration; and cooling the stack under tension for a select time.

In one embodiment, the laying step includes laying the staves having at a curve of at least one stave facing downwards.

In one embodiment, the method further includes laying the first layer on a base structure; and laying at least two first separators between the first layer and the second layer.

In one embodiment, the method further includes cutting at least one stave having a first length, a first width and a first depth at a select depth thereby forming two cut staves each having the first length, the first width and a cut second depth, and having an uncut first side and a rough cut second side; planing the rough cut second side of at a first cut stave thereby forming a substantially smooth cut second side; trimming at least one first edge of the first cut stave along the first length thereby forming a trimmed first edge of the first cut stave; and planing the trimmed first edge of the first cut stave thereby formed a substantially smooth first edge of the first cut stave.

In one embodiment, the method further includes affixing the first cut stave to a substrate.

In one embodiment, the invention features a construction material including at least one stave processed according to the method of invention.

In one aspect, the invention features a container adapted for containing a fluid including a substantially sanitized interior surface; wherein the interior surface includes an infusion agent infused into at least one of a pore, a cell and a fiber of the container. In one embodiment, the infusion agent includes at least one of an alcohol component, a fruit component, a fruit concentrate component, a coffee component, a tea component, an herb component, a synthetic flavoring component, a natural flavoring component, and a combination of at least two of the aforementioned components.

In one aspect, the invention features a stopper adapted for substantially sealing a fluid container comprising a second end adapted for reversibly connecting to at least one of a pressure gauge, a temperature gauge, a device adapted for supplying at least one of a working fluid and an infusion agent, a sealing device, and a screen adapted for containing a product capable of burning.

In one aspect, the invention features a jig adapted for holding and guiding a piece of work including a cutting device disposed to slide along a track of a selected length, the track being mounted at a height adapted to permit the plunging of the cutting device into the piece of work thereby cutting the piece of work; a clamping device adapted to clamp thereby holding steady the piece of work during the cutting thereof; wherein the an edge of the piece of work cat be cut to a selected depth; and wherein the piece of work includes a stave having at least a partial concavity.

In one aspect, the invention features a rack system adapted for at least one fluid container disposed thereon including at least a first and a second set of at least two wheels adapted for turning the fluid container disposed on the rack system; a piping delivery conduit adapted for reversible fluidic communication with an interior of the fluid container disposed on the rack system; a catchment device in fluidic communication with the interior of the fluid container disposed on the rack system; and a cover for reversible placement over the fluid container disposed on the rack system and adapted for maintaining the fluid container at a minimum temperature; wherein the piping delivery conduit includes at least one control for reversibly controlling at least an amount of a working fluid in fluidic communication with the interior of the fluid container.

BRIEF DESCRIPTION OF THE SEVERAL VIEWS OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 12 is a flow chart of a method according to an embodiment of the present invention.

DETAILED DESCRIPTION OF THE INVENTION

Process for Reconditioning a New or Used Fluid Container

Figure 1:
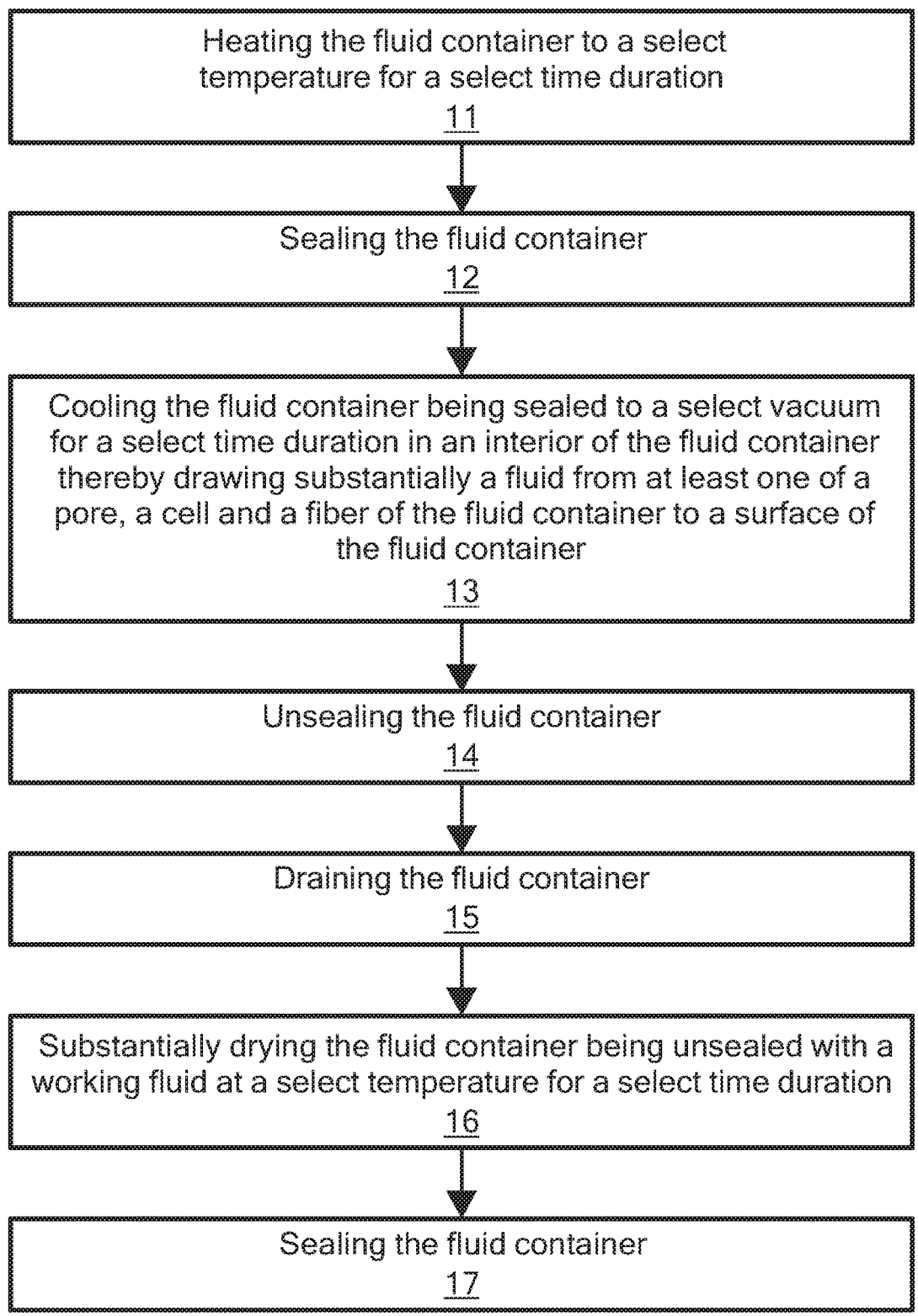
FIG. 1 is a flow chart of a method according to one embodiment of the present invention.

In one aspect, the invention features a process (10) for reconditioning a new or previously used fluid container, as shown in FIG. 1. For purposes of this application, the terms "reconditioning, recondition, and reconditioned" can be used interchangeably with the terms "conditioning, condition, and conditioned" and includes processes, methods, steps and/or cycles adapted for conditioning and/or reconditioning, respectively, new and/or used fluid containers. For purposes of this application, the term "fluid container" includes an entire fluid container being reconditioned or a fluid container containing a partial fluid container and/or a chip, cube, tile, stave, and other product being reconditioned. Preferably, the products include wooden products. The process can include the steps of heating the fluid container to a select temperature for a select period of time (step 11); sealing the fluid container (step 12); and cooling the fluid container (step 13) to a select vacuum for a select time duration. The operating conditions of the heating and the cooling steps can be selected to clean and draw from a plurality of pores, cells and/or fibers to a surface of a material of the fluid container fluid remaining inside the fluid container. The fluid can be drawn to the surface without vaporization or can be vaporized substantially stripping the fluid container depending upon the desired end use of the reconditioned fluid container.

In an embodiment of the invention, the fluid container is a new or used wooden barrel.

In one embodiment of the invention, the heating step includes maintaining a minimum temperature of 180° F. in the fluid container for a select time duration in a range of one minute to ten minutes, and preferably a range of two minutes to eight minutes, and more preferably a range of three minutes to five minutes. In a preferred embodiment, the heating fluid includes steam. In a more preferred embodiment, the heating step includes passing steam at approximately 212° F. into the fluid container for a time duration of 5 minutes.

Figure 2A:
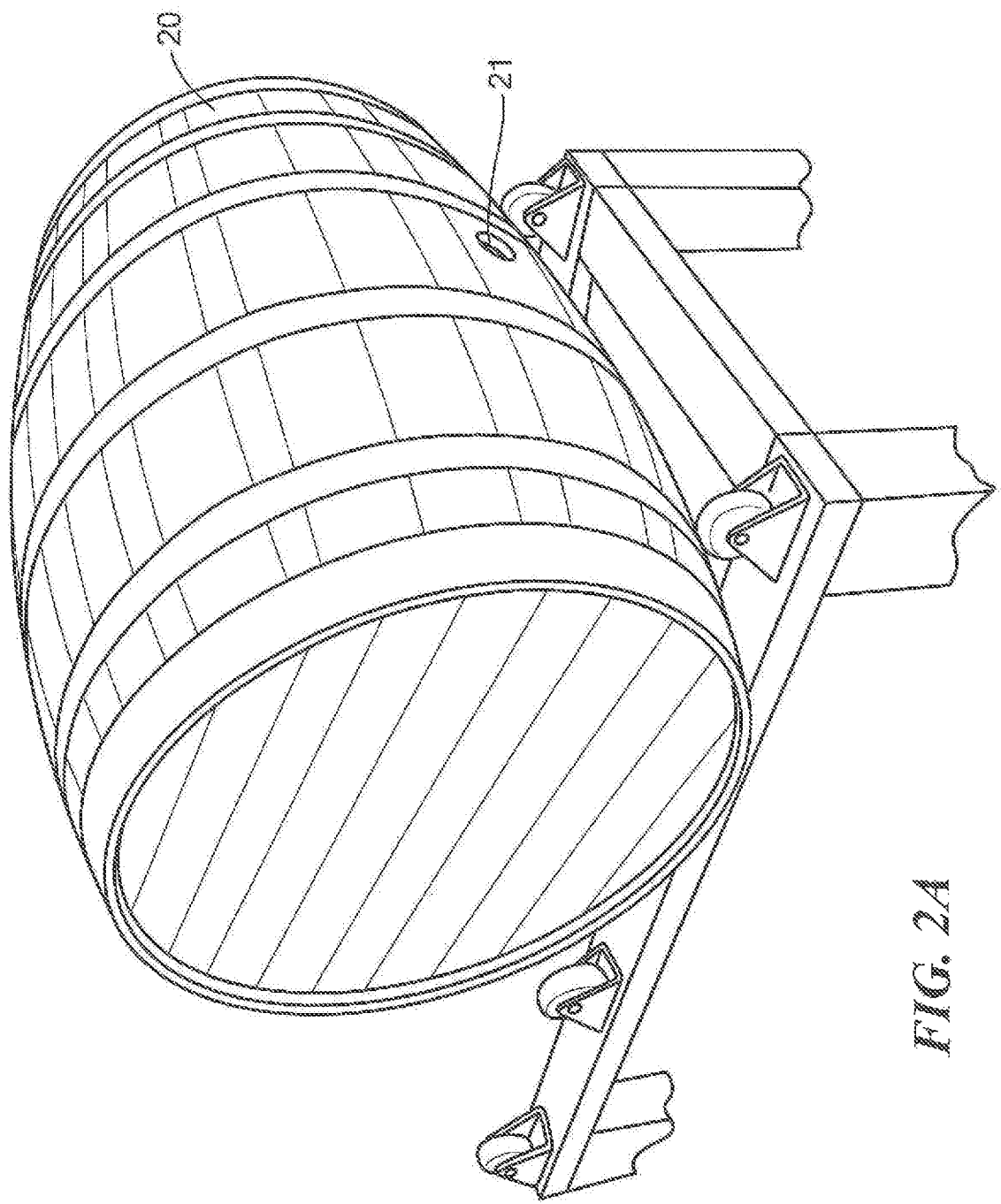
FIG. 2A is a view according to one embodiment of the present invention.
Figure 2B:
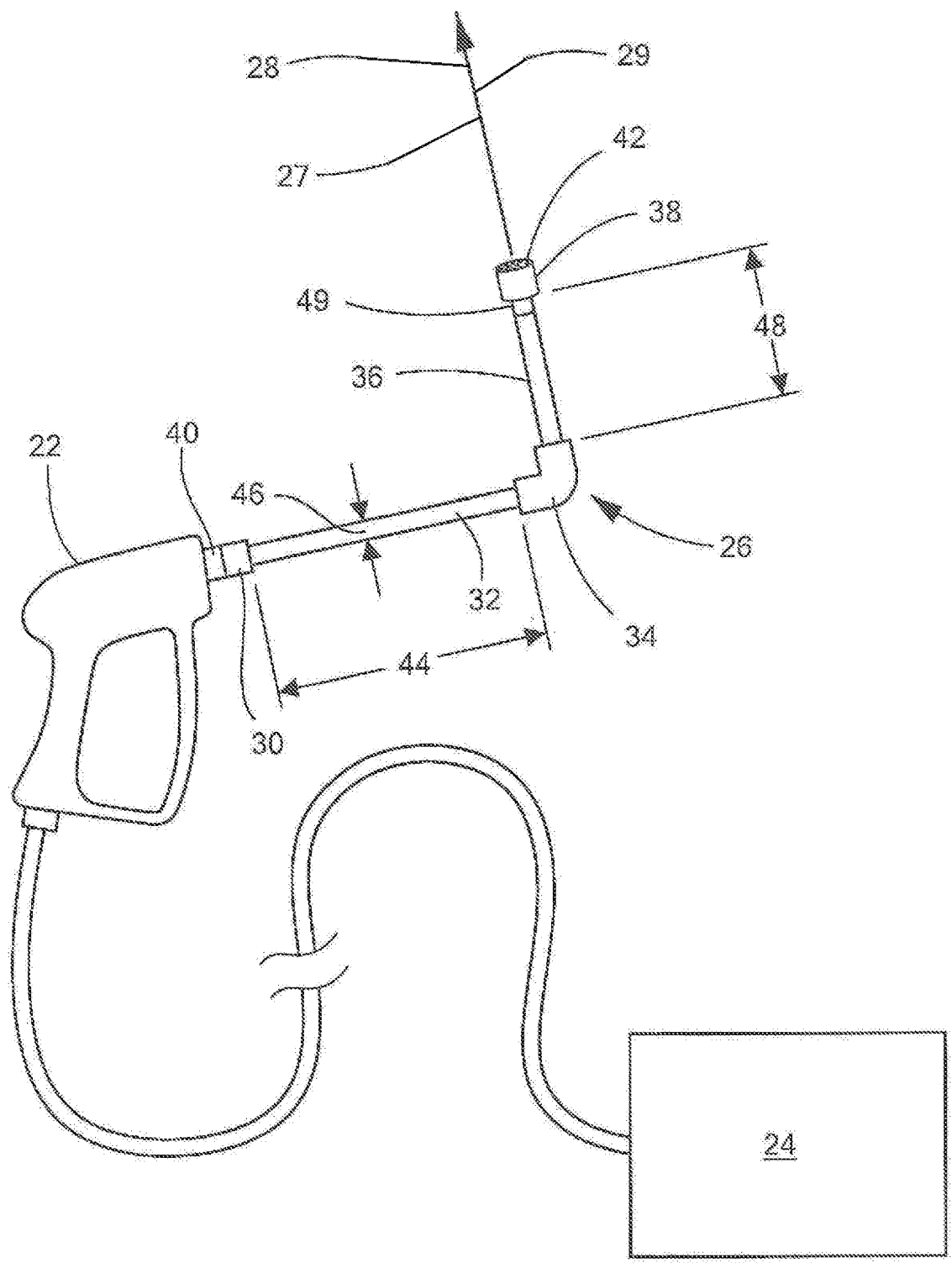
FIG. 2B is a view according to one embodiment of the present invention.
Figure 3A:
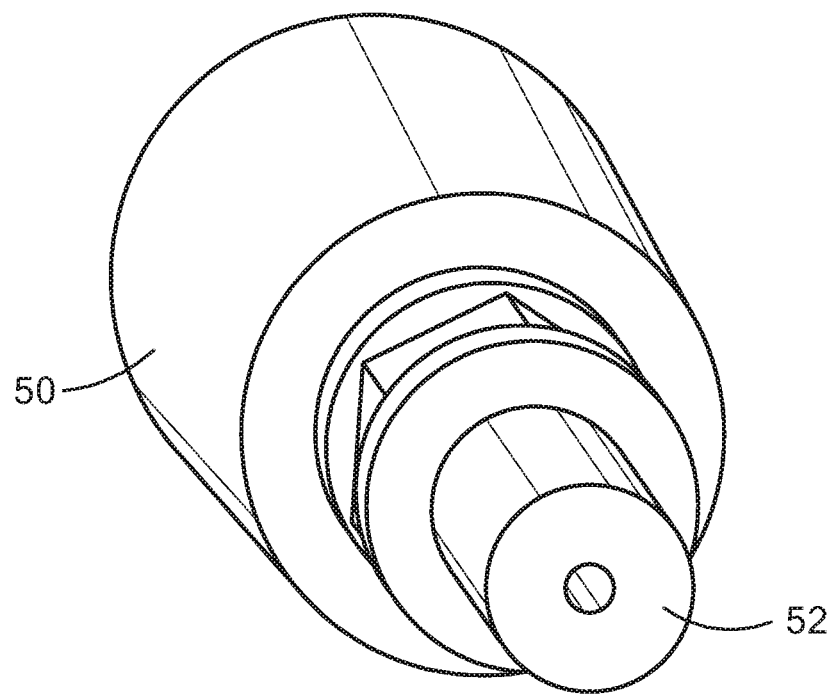
FIG. 3A is a view according to one embodiment of the present invention.
Figure 3B:
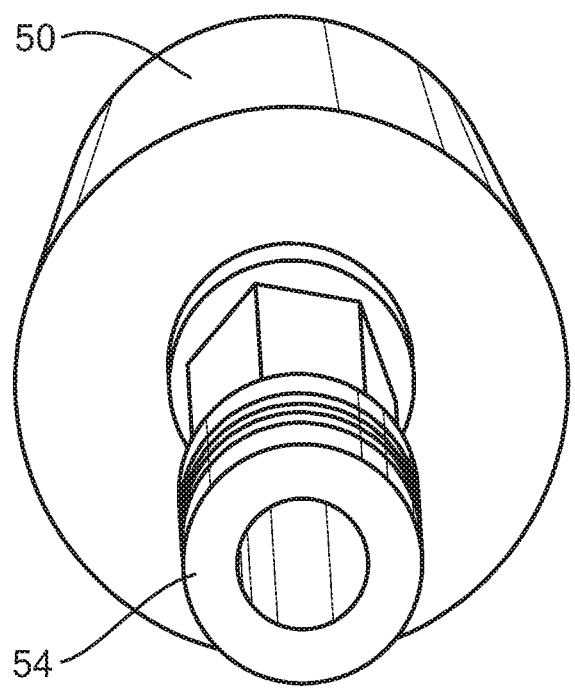
FIG. 3B is a view according to one embodiment of the present invention.
Figure 3C:
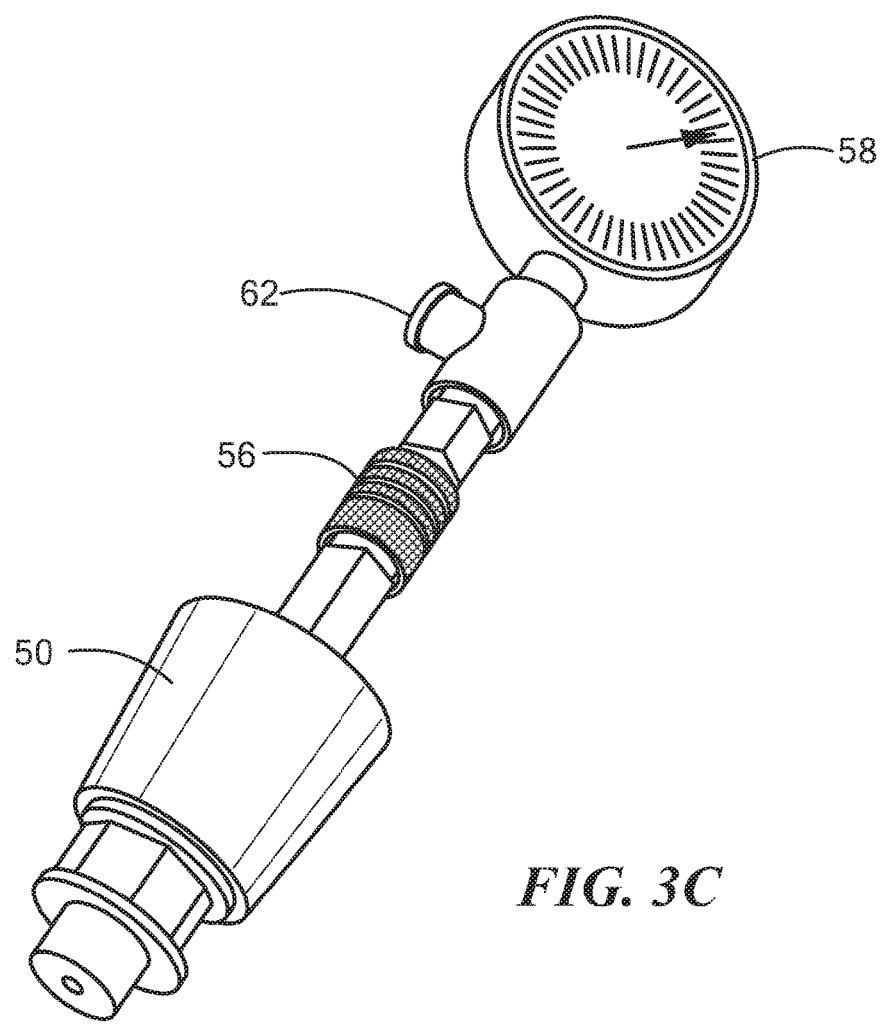
FIG. 3C is a view according to one embodiment of the present invention.
Figure 3D:
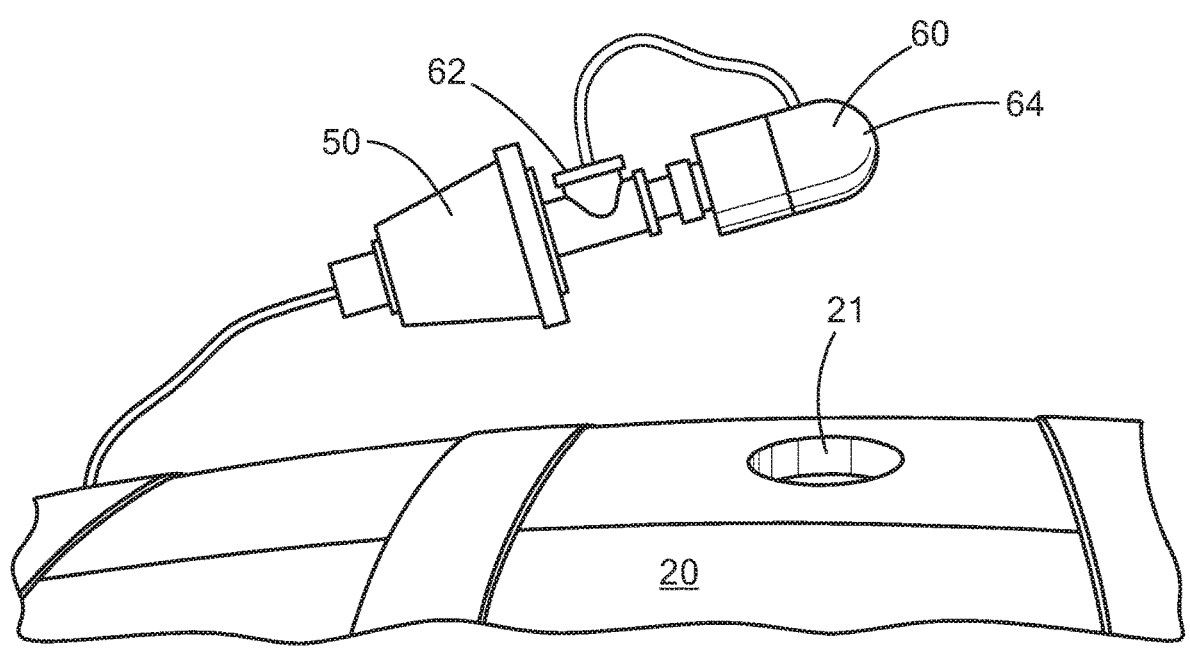
FIG. 3D is a view according to one embodiment of the present invention.
Figure 3E:
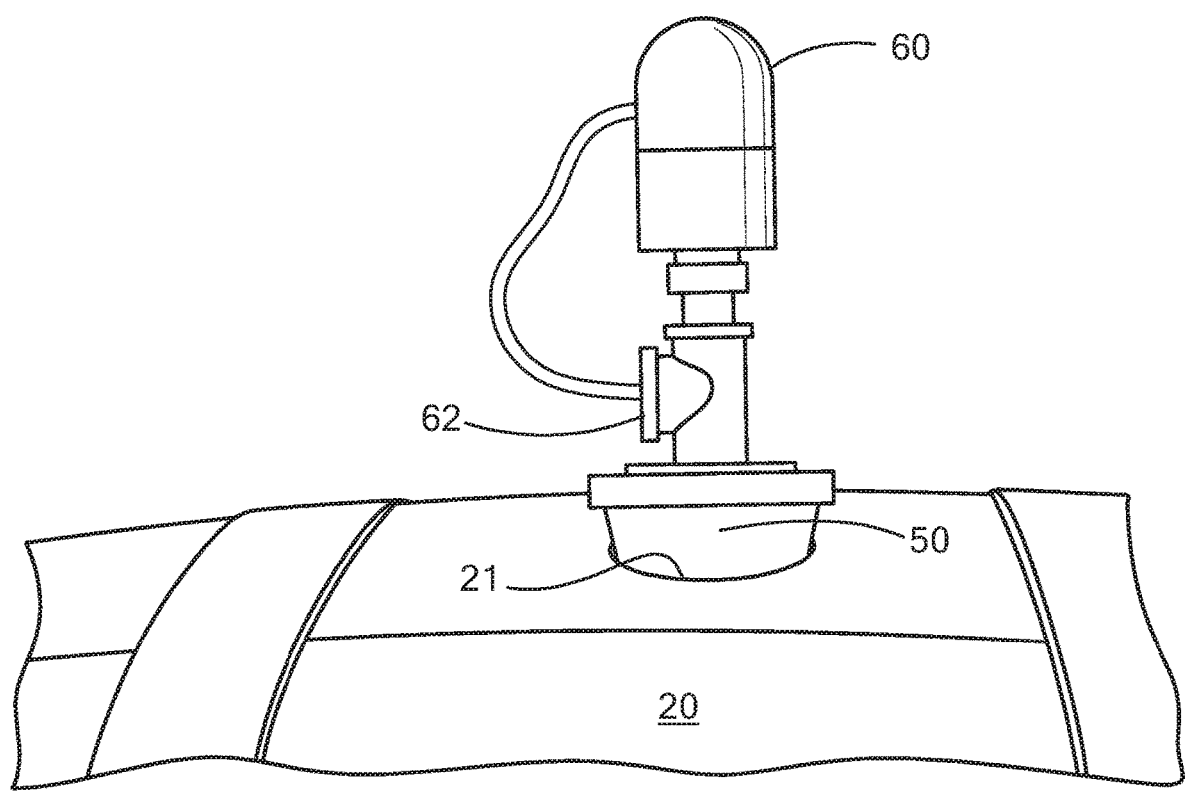
FIG. 3E is a view according to one embodiment of the present invention.

In one embodiment, the heating step includes heating the fluid container (20) by supplying a working fluid (27) including a heating fluid (28) to the fluid container (20), as shown in FIG. 2A-2B. In a preferred embodiment, the heating fluid (28) includes steam (29). The steam (29) is passed to the fluid container (20) with a steaming device (22) fluidically connected to a steam source (24), as shown in FIG. 2B. In one non-limiting embodiment, the steaming device (22) includes a spray nozzle adapter (26) adapted to optimize delivery of the steam (29) to the fluid container (20). In one embodiment, the spray nozzle adapter (26) includes a first end (30) connected to a first leg (32) connected to an elbow (34) connected to a second leg (36) connected to a second end (38), wherein the first end (30) is adapted for reversible connection to a spray end (40) of the steaming device (22) and the second end (38) includes holes (42) configured for delivery of the steam (29). In different embodiments of the invention, the elbow (34) can be configured at various angles between greater than 0 degrees and less than 180 degrees to optimize ease of the delivery of steam (29) to the fluid container (20) during the reconditioning process. In a preferred embodiment, the elbow is configured at a 90 degree angle. A length (44) and a diameter (46) of the first leg (32) and a length (48) and diameter (49) of the second leg (36) of the spray nozzle adapter (26) can be selected to optimize ease and efficiency of the delivery of the steam (29) to the fluid container (20). In other embodiments, other steaming devices known to those of ordinary skill in the art may be used to deliver steam into the fluid container. Such steaming devices can be powered using different power sources such as, for non-limiting examples, electric, liquid fuel and gas power sources. In still other embodiments, other devices known to those of ordinary skill in the art may be used to deliver the working fluid including a heating fluid to the fluid container. Such devices can also be powered using different power sources.

In one embodiment, the step of sealing the fluid container (20) includes a step of inserting a stopper or bung (50) into an opening (21) of the fluid container (20) thereby creating a pressure seal of the fluid container (20), as illustrated in FIGS. 3A-3E. During the subsequent cooling step, a vacuum builds in the pressure sealed fluid container. This vacuum inside the fluid container during the cooling step draws out liquids or contaminants from the fluid container and pulls the deeply soaked spirits deeply soaked into the fluid container closer to the surface of the interior of the fluid container. The maximum vacuum created can be modified by one of ordinary skill in the art, as necessary or desired. In a preferable embodiment, the maximum vacuum created is approximately 15 inches mercury.

In one embodiment, the step of sealing the fluid container includes inserting a first modified stopper or bung (50) into an opening (21) of the fluid container. The first modified stopper (50) can be made of silicon or other materials known to those of ordinary skill in the art which can be formed in the necessary size and shape for inserting into and creating a pressure seal of a fluid container. The first modified stopper (50) can have a first end (52) adapted for inserting into the opening (21) of the fluid container (20) and a second end (54) adapted for reversibly connecting to a first end (56) of a pressure gauge and/or a temperature gauge (58). The pressure and/or temperature gauge can be a digital gauge (60). The gauge can have a second end (62) for reversibly connecting to a conduit adapted for connecting to a device for supplying a working fluid including, for non-limiting examples, a heating fluid and/or a drying fluid, the latter being described subsequently in the application. The gauge can include a blue tooth (64) or similar mechanism for wirelessly connecting to a wireless device for monitoring of the pressure and/or temperature of the fluid container during the reconditioning process.

Figure 4A:
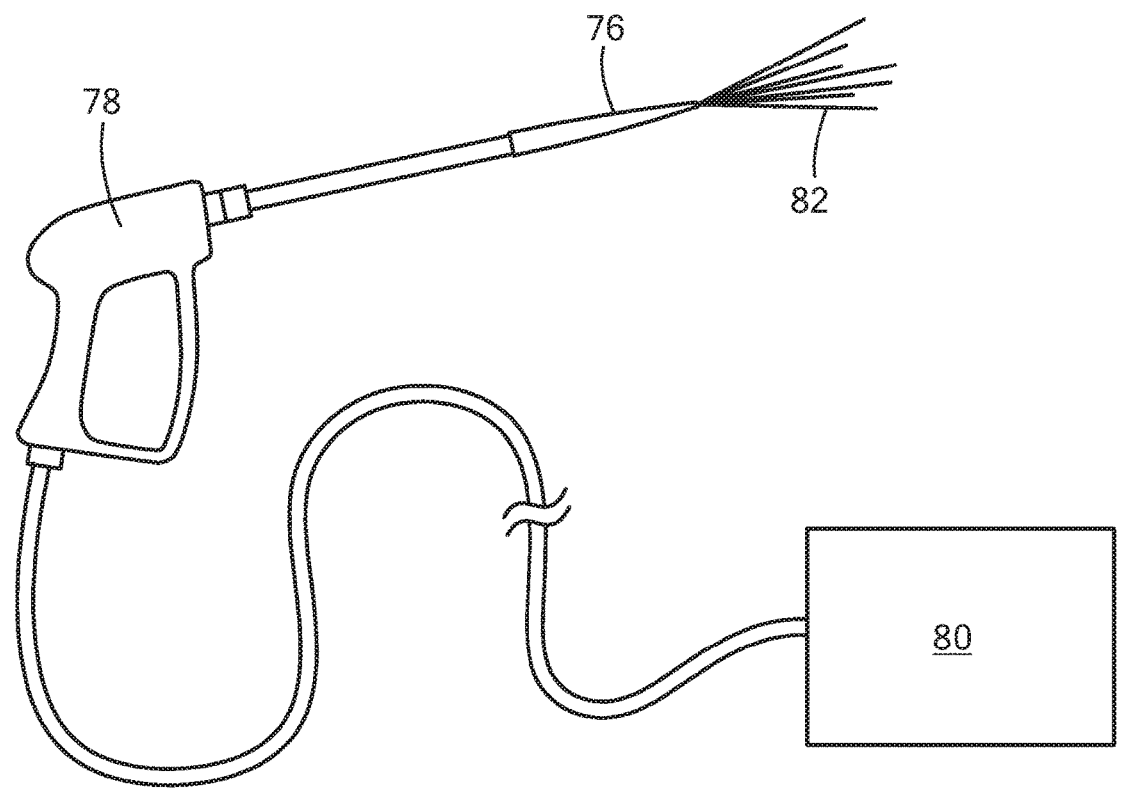
FIG. 4A is a view according to one embodiment of the present invention.
Figure 4A:
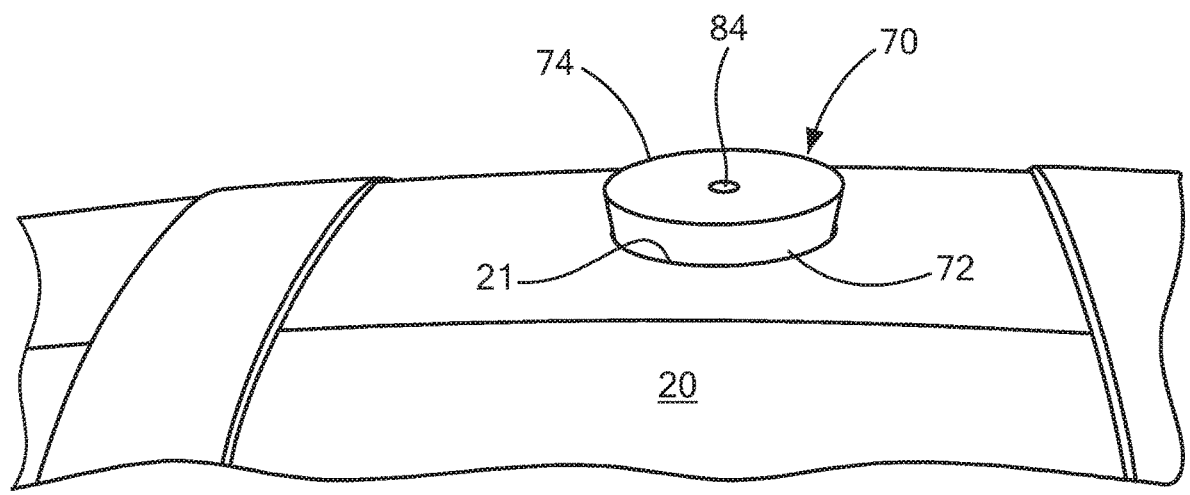
Figure 4B:
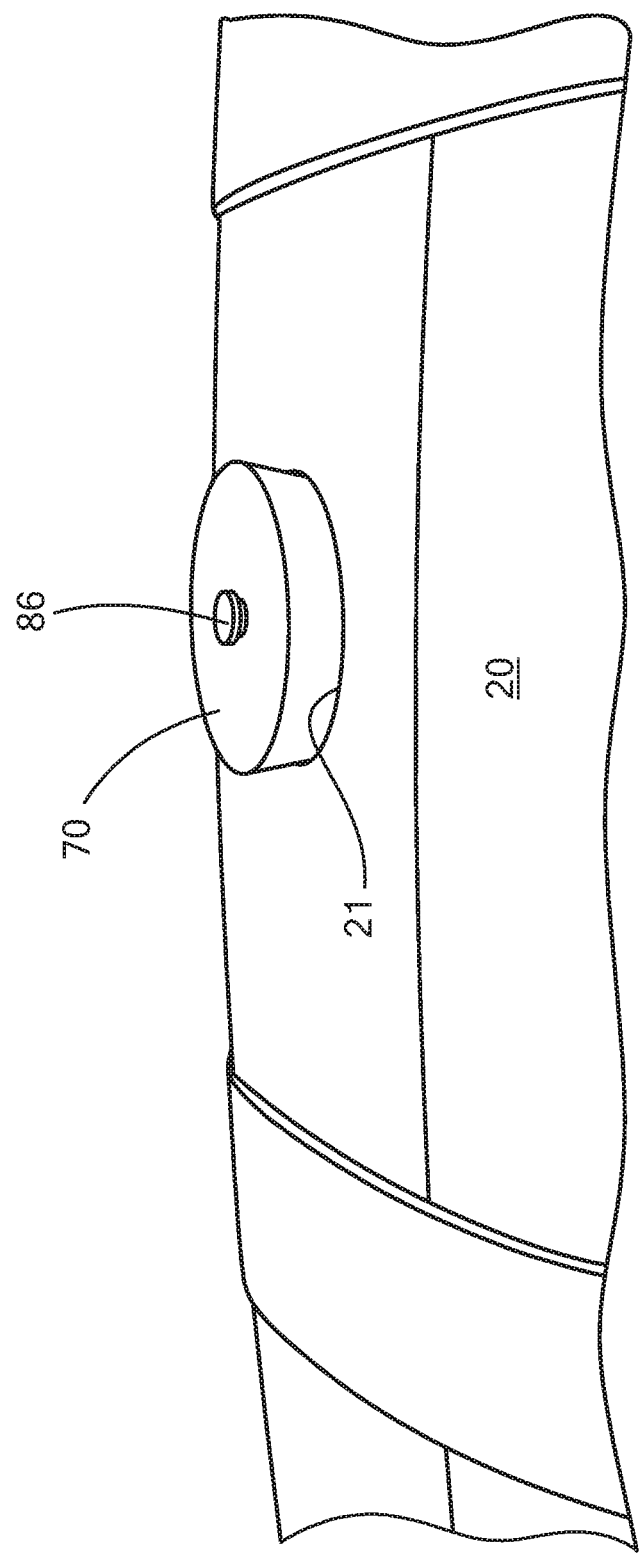
FIG. 4B is a view according to one embodiment of the present invention.

In another embodiment, the step of sealing the fluid container includes inserting a second modified stopper or bung (70) into an opening (21) of the fluid container (20), as shown in FIG. 4A. The second modified stopper (70) can include a first end (72) for inserting into the opening (21) of the fluid container (20) and a second end (74) adapted for reversibly connecting with a nozzle (76) of a nozzle gun (78) in line with a device (80) supplying a working fluid (82) including a heating fluid and/or or a drying fluid, the latter being described subsequently in the application. In a preferred embodiment, the second end (74) is adapted with a sunk hole (84) drilled to a size to reversibly mate with a nozzle gun (78) connected to a supply device (80) for supplying a working fluid (84) including, for non-limiting examples, a heating fluid or a drying fluid. The second end (74) of the second modified stopper (70) can be further adapted to reversibly receive a sealing device (86) known to those of ordinary skill in the art for sealing the second end (74) of the second modified stopper (70) once the nozzle gun (78) is disconnected from the second end (74) of the second modified stopper (70), as shown in FIG. 4B. In a preferred embodiment, a nail, such as a galvanized nail, is used as the sealing device (86) to seal the second end (74) of the second modified stopper (70) after removal of the nozzle gun (78).

In different embodiments, the cooling step includes cooling the fluid container thereby creating a drop in pressure in the interior of the sealed fluid container. The cooling step can be conducted to achieve a select vacuum having a maximum of 15 to 20 inches mercury in the interior of the sealed fluid container for a select time duration time from the start of the cooling step. The select time duration is selected in a range of one to 20 minutes, and preferably in a range of 5 to 15 minutes. The select vacuum of the fluid container and time duration of the cooling step are selected for optimally drawing out substantially any remaining liquids in the pores, cells and/or fibers of the material of the fluid container to the surface of the material of the fluid container as well as any air or moisture remaining in the fluid container.

In other embodiments, the method of the invention can include unsealing the fluid container (step 14) and removing and/or draining fluid from the fluid container (step 15), as shown in FIG. 1.

In additional embodiments, the process of the invention can include conducting one or more supplementary heating, sealing, cooling, unsealing and draining steps or cycles including supplementary heating of the fluid container to a select temperature for a select period of time; and conducting a supplementary cooling of the fluid container to maintain a select vacuum for a select time duration, wherein operating conditions of each of the heating and the cooling steps are selected to clean, vaporize and draw from a plurality of pores, cells and/or fibers of the fluid container to a surface of a material of the fluid container fluid remaining inside the fluid container. The operating conditions of the supplementary heating and cooling steps further may be selected based on desired cleanliness and heating needed for the desired end use application of the reconditioned fluid container and fall within the heating and cooling steps already previously described in the application.

In still other embodiments, the invention further includes passing in one or more steps or cycles a working fluid including a drying fluid at a select temperature and for a select time duration into the interior of the fluid container, and drying and optionally pressurizing an interior of the fluid container with the drying fluid, as shown in step 16 of FIG. 1. The terms "drying fluid and/or drying fluids" include "any substance or substances that flow or deform under an applied shear stress" and can include, for a non-limiting example, air. In one embodiment, the drying and optionally pressurizing step includes blowing the drying fluid at a select minimum temperature into the fluid container for a select time duration to maintain a minimum temperature in the interior of the fluid container. The type of drying fluid, the minimum temperature of the drying fluid, the minimum temperature in the interior of the fluid container and the time duration of the drying step are selected according to the desired speed and thoroughness of the drying and optional pressurizing for the desired end use application of the fluid container. Notably, it may be desired to maintain the interior of the fluid container at a minimum temperature in order to facilitate subsequent fluid container processing. In different embodiments, the drying and optional pressurizing step includes maintaining a minimum temperature in the interior of the fluid container in a range of 150 F-500 F, and preferably in a range of 160 F-400 F, and more preferably in a range of 170 F-300 F. In a most preferred embodiment, the interior of the fluid container is maintained at a minimum temperature of 173.1 F to facilitate further processing of the fluid container, including, for example, vaporizing any alcohol components which subsequently may be added to the fluid container. In a preferred embodiment, the drying fluid is hot air. In another embodiment, an oxy-propane torch is used to heat air in the interior of the fluid container.

The fluid container can be optionally sealed prior to shipment, as shown in FIG. 1 (step 17).

Figure 5A:
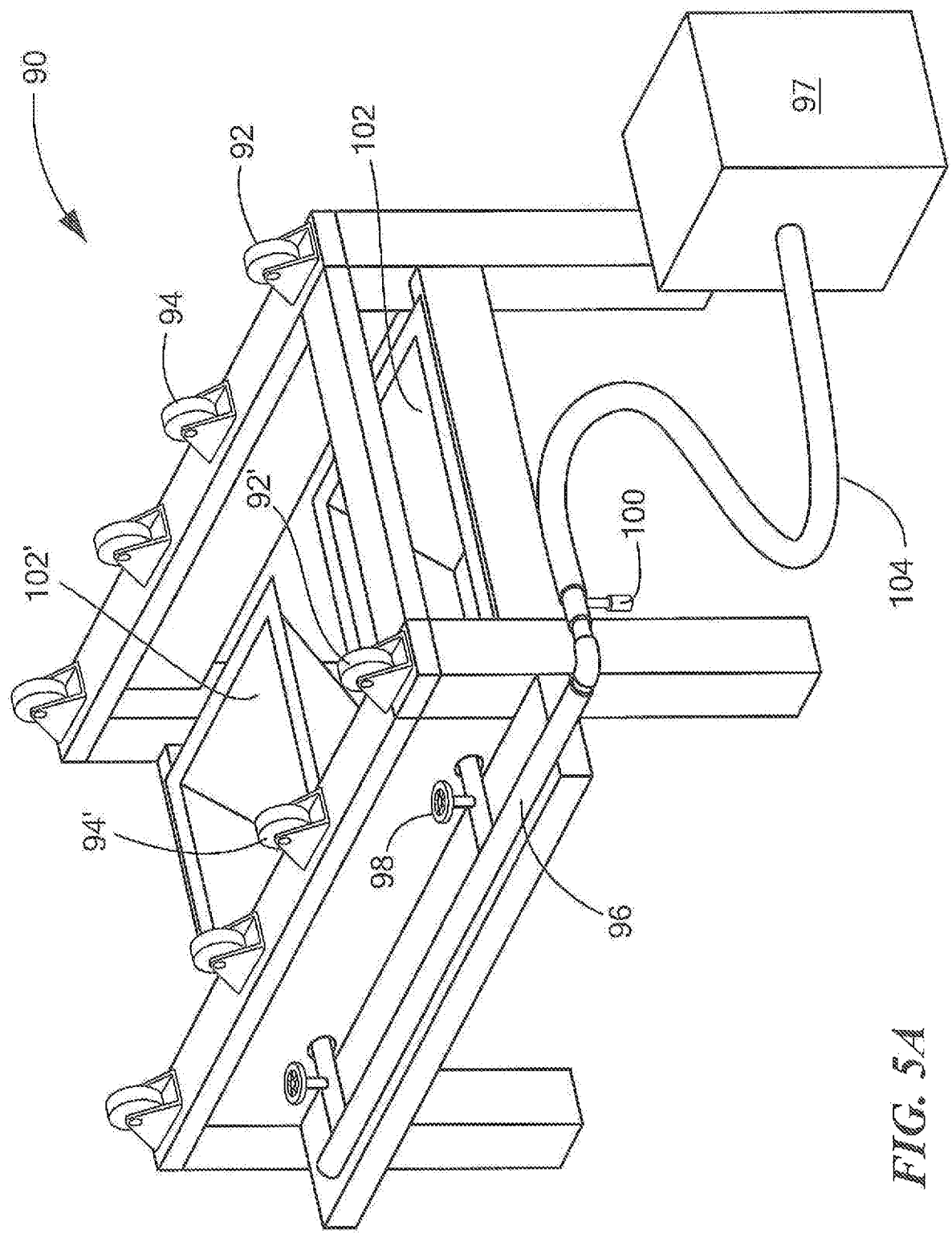
FIG. 5A is a view according to one embodiment of the present invention.

In one embodiment, the invention includes a step of situating the fluid container on a fluid container rack system (90), as shown in FIG. 5. The fluid container rack system can include at least a first (92, 92') and a second (94, 94') set of at least two wheels for turning a fluid container disposed thereon. The fluid container rack system (90) can include at least one piping delivery conduit (96) configured for fluidic communication with a fluid container disposed on the fluid container rack system (90) and a source (97) adapted for supplying or receiving a working fluid. The piping delivery conduit can include at least one control valve (98) for reversibly controlling the passage of the working fluid in the piping delivery conduit (96). The piping delivery conduit (96) can also include a bleed valve (100) for reversibly bleeding off additional pressure which may build up within the piping delivery conduit (96). The fluid container rack system can include a catchment device (102) for receiving fluid received from inside of a fluid container. The catchment device (102) can include a conduit such as piping (104) configured for fluidic communication from the catchment device (102) to a centralized fluid reservoir such that fluid received in the catchment device (102) can be transported to the centralized fluid reservoir.

Figure 5B:
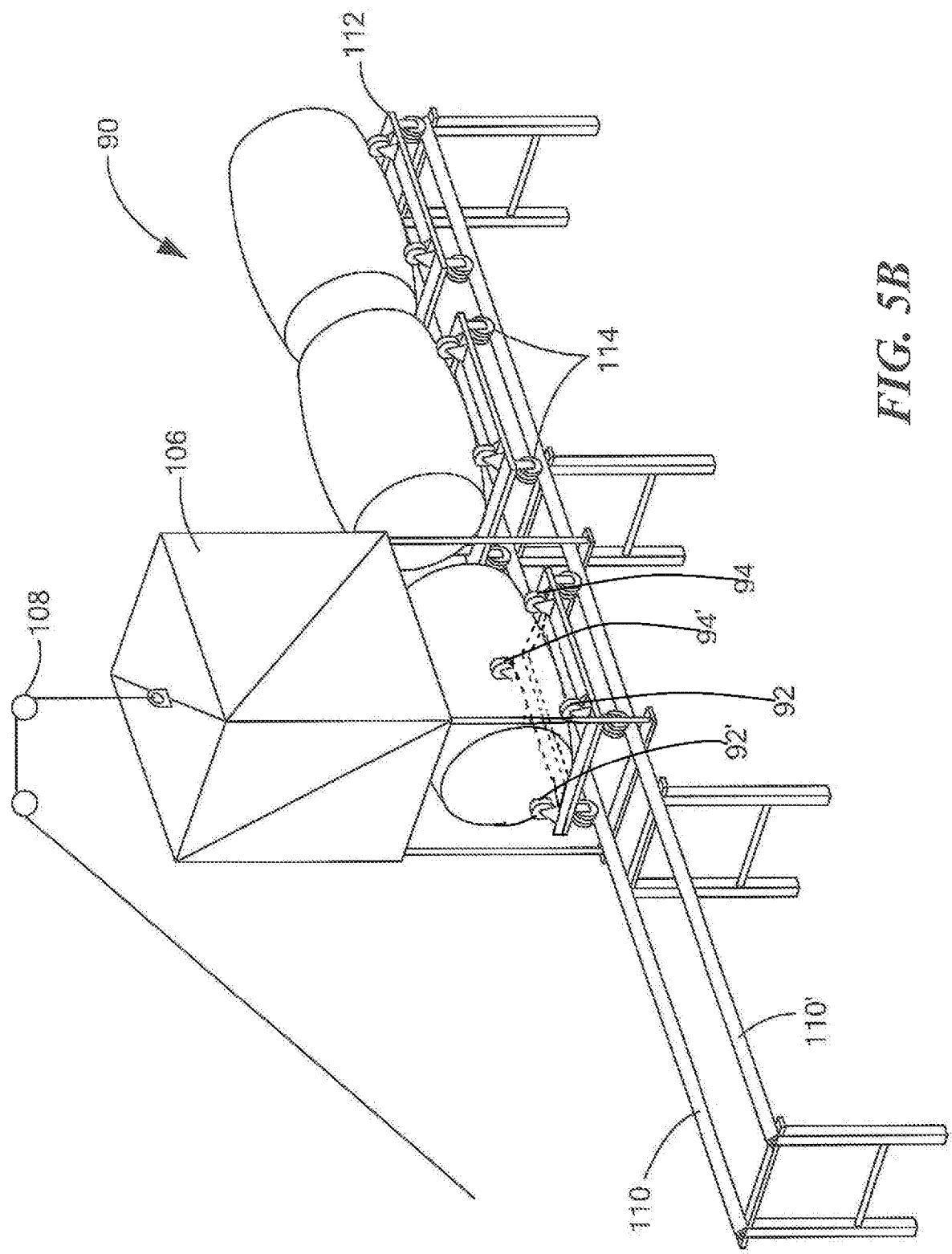
FIG. 5B is a view according to one embodiment of the present invention.

In one embodiment, the fluid container rack system (90) can include a cover (106) adapted for placement over a fluid container during at least one of the processing steps and a transport mechanism (108) adapted for raising and lowering said cover (106) over the fluid container, as shown in FIG. 5B. In another embodiment, the fluid container rack system (90) includes at least two tracks (110, 110') and at least one dolly sized rack (112) including dolly wheels (114) configured for travelling on the tracks (110, 110'). The dolly sized rack (112) includes the at least a first (92, 92') and a second (94, 94') set of at least two wheels for turning a fluid container disposed thereon. The dolly sized rack (112) configured for travelling on the tracks (110, 110') thereby facilitates movement of one or more fluid containers during processing.

Process for Infusing an Agent into a Fluid Container

In yet another aspect, the invention features infusion process for infusing an infusion agent into a material of a fluid container. The infusion agent can include at least one of a flavoring fluid, a sanitizing fluid, a hydration fluid, and a combination of at least two of the afore-mentioned fluids. Alternatively or additionally, the infusion agent can include a single fluid having flavoring, sanitizing and/or hydrating properties. The flavoring fluid can include at least one of an alcohol component, a fruit component, a fruit concentrate component, a coffee component, a tea component, an herb component, a synthetic flavoring component, a natural flavoring component, and a combination of at least two of the aforementioned components.

In one aspect, the infusion process includes adding an agent to a fluid container; sealing the fluid container; adding a pressurizing fluid to the fluid container; and cooling the fluid container, thereby forcing the agent into at least one of a pore, a cell and a fiber of a material of the fluid container.

In one embodiment, the infusion process includes providing a fluid container reconditioned according to the reconditioning process of the invention as described above.

In one embodiment, the infusion process includes heating the fluid container to a minimum temperature.

In one embodiment, the infusion process includes the step of maintaining the fluid container at a minimum temperature for optimizing the infusion process. In one embodiment, the infusion agent includes an alcohol component, and the fluid container is maintained at a minimum temperature equal to the boiling point of the alcohol component. In another embodiment, the infusion agent includes ethanol and the fluid container is maintained at a minimum temperature of 173.1 F. Thus, when the infusion agent including the ethanol component is added to the fluid container, the ethanol component is vaporized upon addition to the fluid container.

In one embodiment, the invention includes adding the infusion agent to the fluid container at atmospheric pressure.

In one embodiment, the infusion process includes adding a working fluid including a pressurizing fluid to create a minimum starting pressure in an interior of the fluid container. The minimum starting pressure is selected in accordance with the interior fluid container pressure dropping to atmospheric pressure during the cooling step. When the infusion agent is added to a heated fluid container at atmospheric pressure, and the fluid container is sealed, the sealed fluid container pulls a vacuum as the sealed fluid container cools. After the pressurizing fluid is added, the infusion agent is forced into the pores, cells and/or fibers of the material of the fluid container as the interior fluid container pressure drops from the minimum starting pressure to atmospheric pressure during the cooling step. In one embodiment, the minimum starting pressure in the interior of the fluid container is in a range of 5-7.5 psi.

Non-limiting examples of an infusion agent for use with the invention include ethanol based liquids fit for human consumption including but not limited to, whiskey, bourbon, rum, gin, tequila, brandy, or concentrates of the aforementioned liquids, alcoholic and non-alcoholic fruit drinks such as ciders and/or fruit concentrates, and coffee and coffee concentrates. The type and quantity of the infusion agent is added according to the desired flavoring of the fluid container. In a preferred embodiment, infusion agent is added in a ratio of 0.375 L to 1.5 L per 200 L fluid container.

Figure 6:
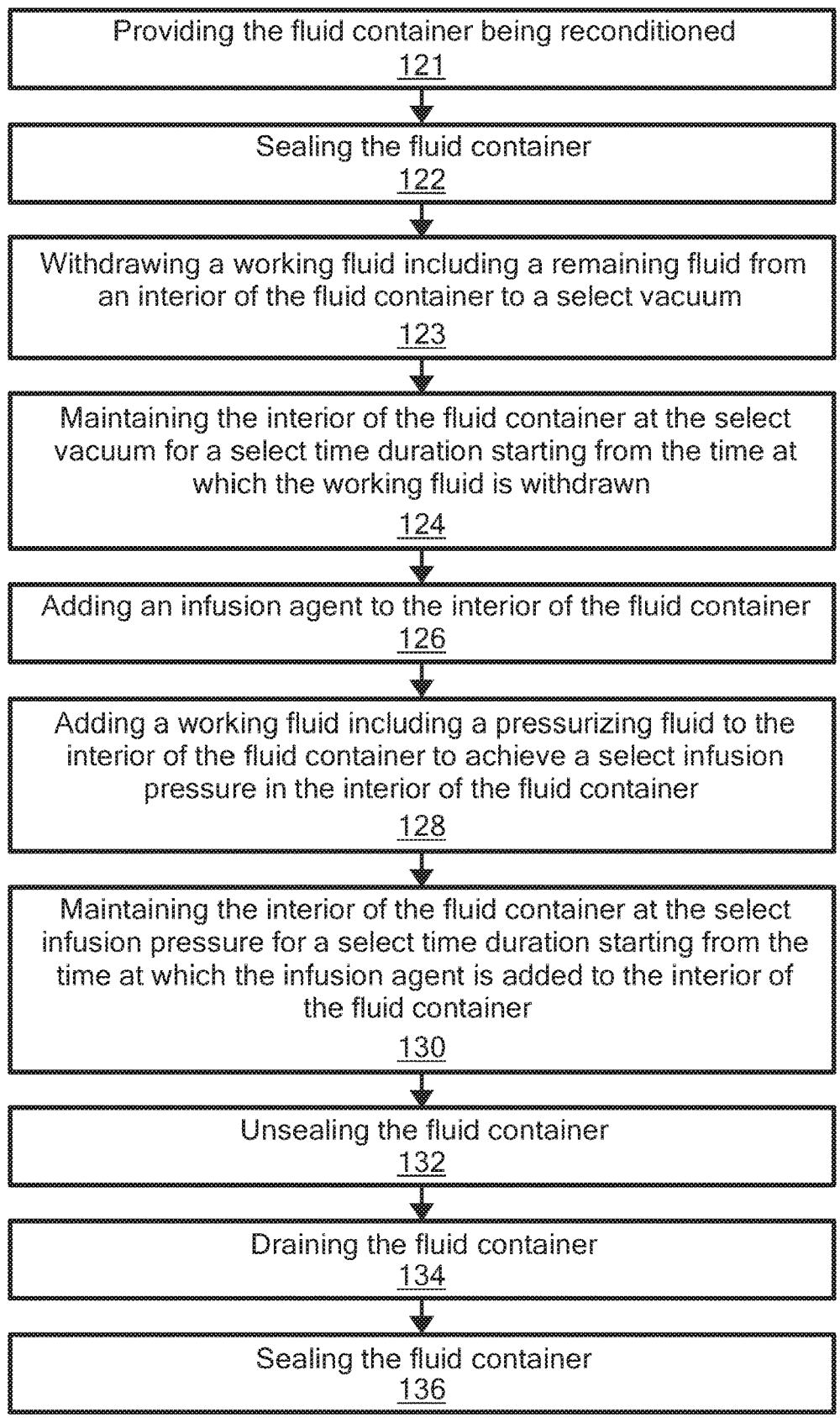
FIG. 6 is a flow chart of a method according to an embodiment of the present invention.
Figure 7A:
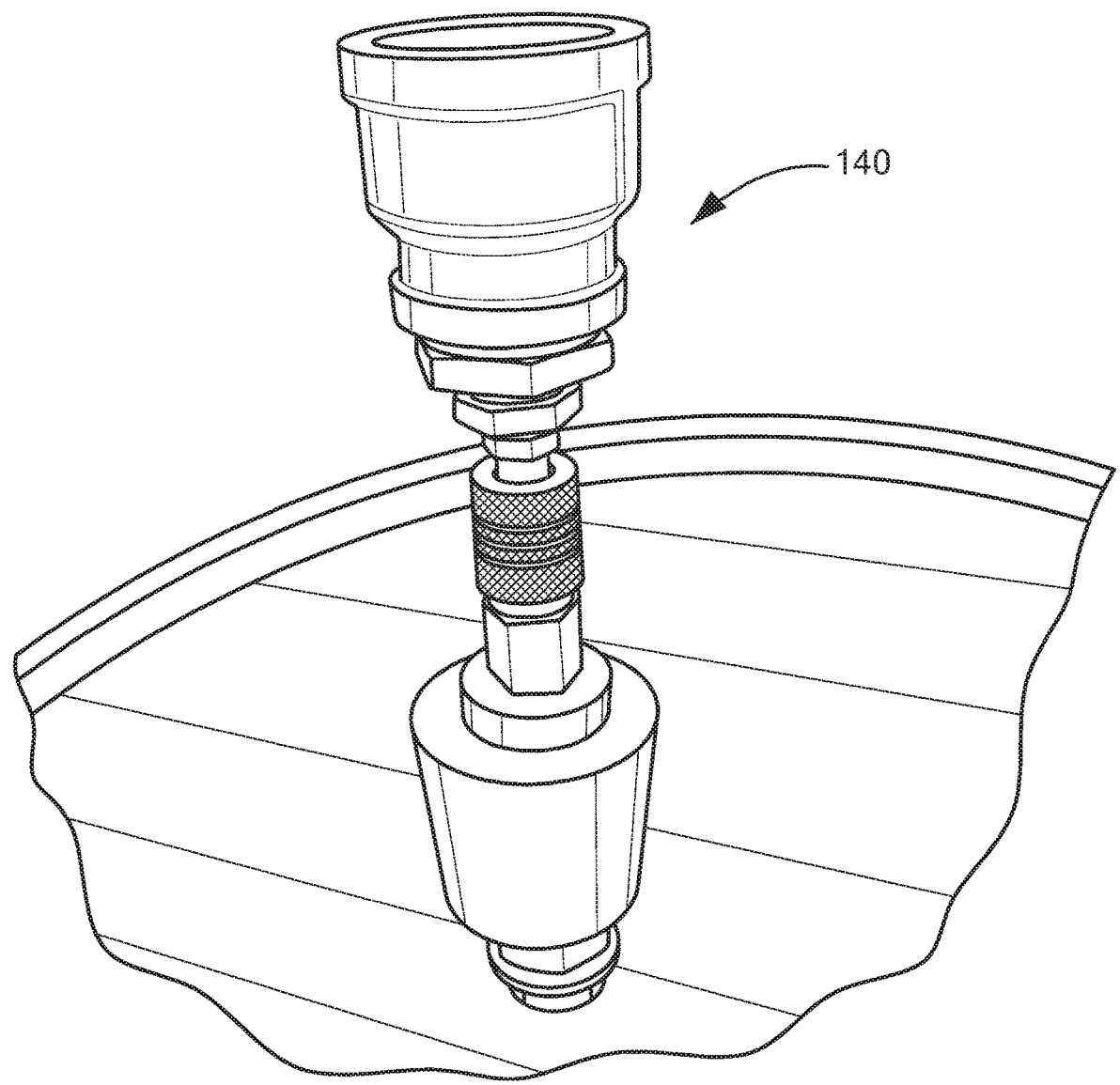
FIG. 7A is a view according to one embodiment of the present invention.
Figure 7C:
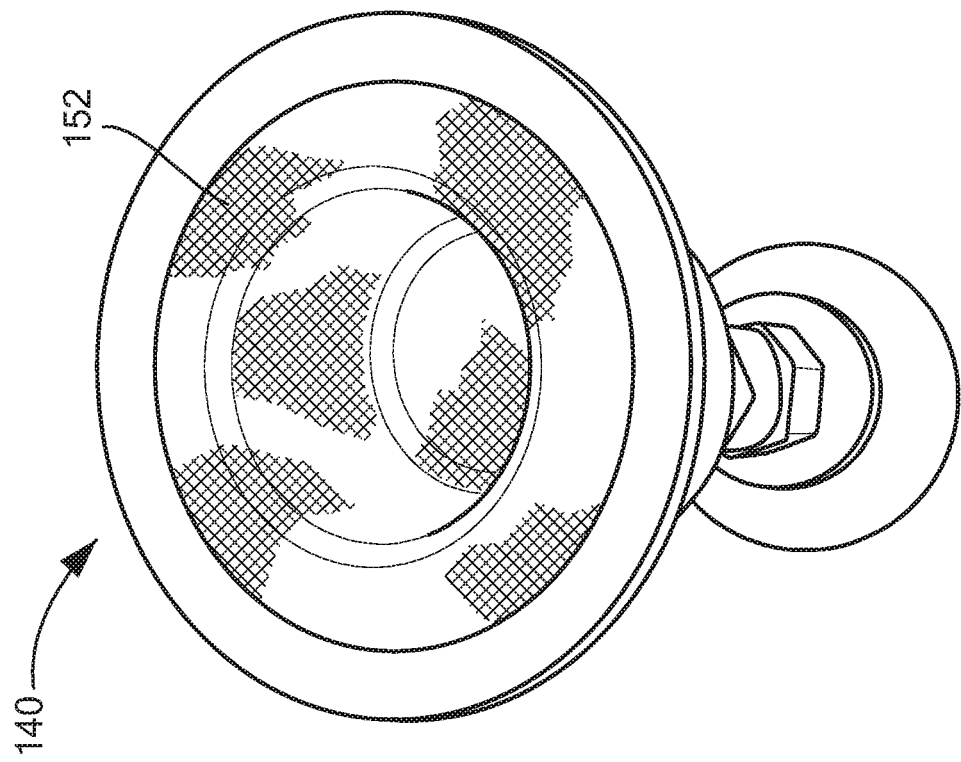
FIG. 7C is a view according to one embodiment of the present invention.
Figure 7B:
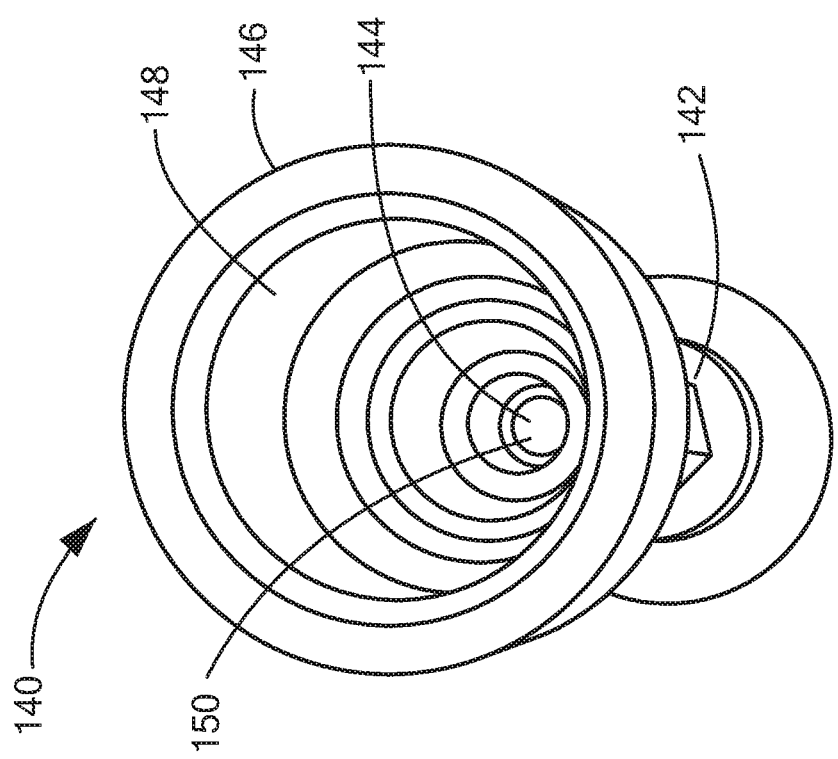
FIG. 7B is a view according to one embodiment of the present invention.
Figure 7D:
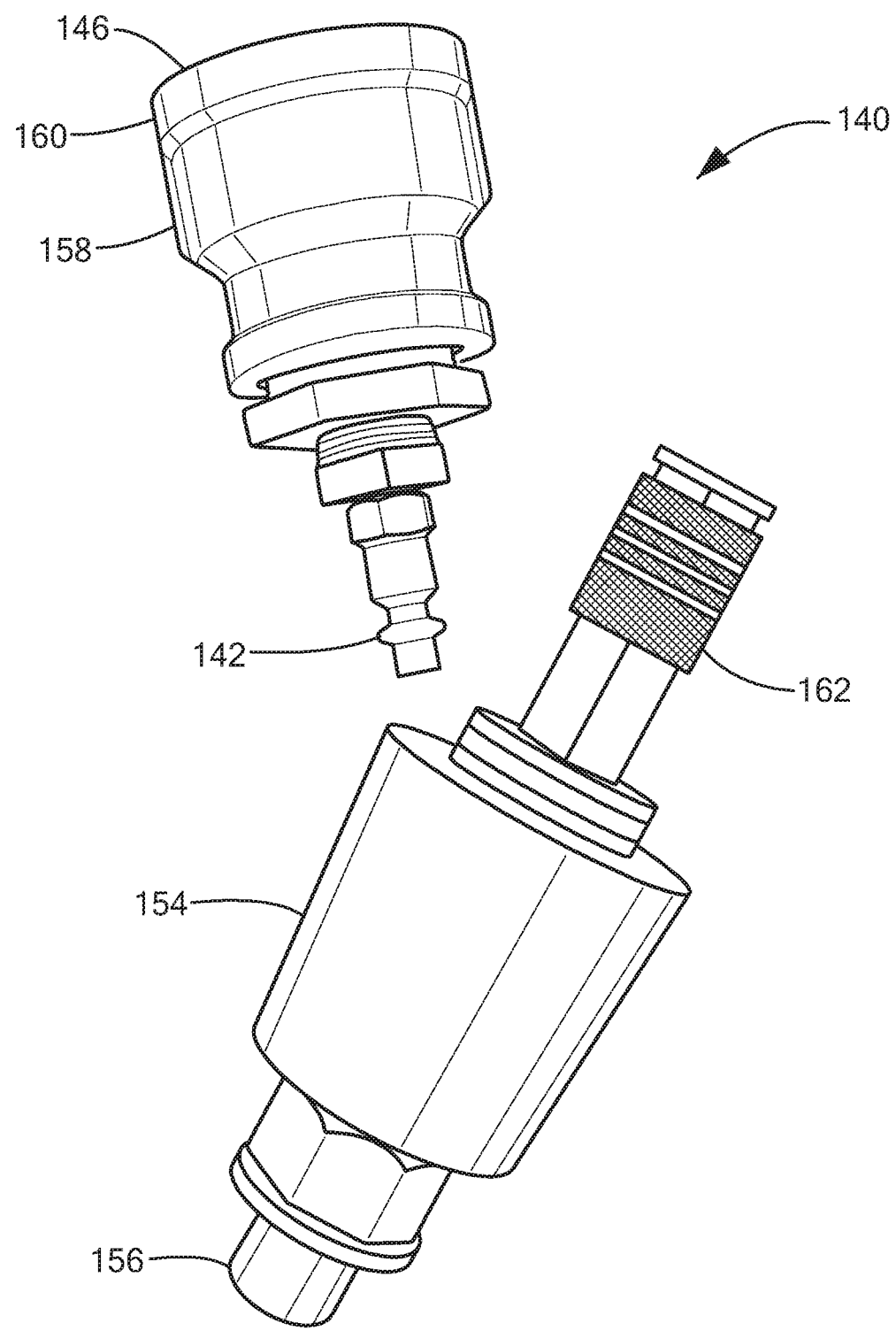
FIG. 7D is a view according to one embodiment of the present invention.

A preferred embodiment of the infusion process (120) of the invention is shown in FIG. 6. In the preferred embodiment, the infusion process includes providing the fluid container being reconditioned (step 121); sealing the fluid container (step 122); withdrawing a working fluid from the interior of the fluid container to a select vacuum (step 123). Preferably, the working fluid is withdrawn from the sealed fluid container prior to adding the infusion agent to the fluid container. The working fluid can include air and moisture and possibly other fluids remaining in the fluid container. The working fluid can be withdrawn by a vacuum pump or another device known to those of ordinary skill for pulling a vacuum in a container. The select vacuum is in a range of 10 inches to 20 inches mercury, and preferably in a range of 15 inches to 20 inches mercury vacuum.

In the preferred embodiment, the infusion process includes maintaining the interior of the sealed fluid container at the select vacuum for a select time duration (step 124) from the start of the withdrawing step to the completion of the maintaining step. The select time duration is chosen for the optimization of the withdrawal of the fluids remaining in the fluid container prior to the addition of the infusion agent to the fluid container. The select time duration can be in a range of 15 minutes to 30 minutes, and preferably in a range of 10 minutes to 40 minutes, and more preferably in a range of 10 minutes to 20 minutes, and most preferably is about 15 minutes.

In the preferred embodiment, the infusion process includes adding the infusion agent to the interior of the sealed fluid container (step 126).

In the preferred embodiment, the infusion process includes adding a working fluid including a pressurizing fluid to the interior of the sealed fluid container including the infusion agent to a select infusion pressure (step 128). In a non-limiting example, the working fluid including the pressurizing fluid includes air. The select infusion pressure is in a range of 3 to 10 psi, and preferably in a range of 5 to 7 psi, and most preferably is 5 psi.

In a preferred embodiment, the infusion process includes maintaining the interior of the sealed fluid container for a select time duration staring from when the infusion agent is added to the fluid container to the end of the maintain step. The maintaining step forces the infusion agent into the pores, cells and/or fibers of the material of the interior of the fluid container (step 130). The select time duration can be in a range of 5 minutes to 15 to 180 minutes, and preferably in a range of 15 minutes to 30.

In preferred embodiments, the infusion process includes unsealing the fluid container (step 132), substantially draining the fluid container (step 134), and optionally sealing the fluid container (step 136) prior to shipment.

In one embodiment, the step of sealing the fluid container includes inserting the first end (72) of the second modified stopper (70) discussed herein into an opening (21) of the fluid container (20) including the infusion agent and reversibly connecting a nozzle gun (78) to the second end (74) of the second modified stopper, as shown in FIGS. 4A-4B. The nozzle gun (78) can be fluidically in line and connected to vacuum pump and/or a compressor such as an air compressor. Once the desired pressure is reached during the steps of withdrawing the working fluid including a remaining fluid from the interior of the fluid container or adding the working fluid including the pressurizing fluid to the interior of the fluid container, the process can include removing the nozzle gun (78) from the second end (74) of the second modified stopper (70) and inserting a sealing device (86) into the second modified stopper (70) to seal the fluid container (20). Further cooling of the fluid container can lead to a drop in pressure thereby further sealing the fluid container. In one embodiment, the invention includes cooling the fluid container until the interior of the fluid container is at atmospheric pressure.

In another embodiment, the step of sealing the fluid container includes inserting a third modified stopper (140) into an opening of the fluid container, as shown in FIGS. 7A-D. The third modified stopper (140) includes a first end (142) having a hole (144) therein, a second end (146) having an opening (148) shaped in a bowl like configuration, and a hollow tube (150) in fluidic communication with the hole (144) of the first end (142) and the opening (148) of the second end (146). The third modified stopper further includes a screen or mesh (152) sized for placement within the opening (148) of the second end (146) of the third modified stopper (140). In one embodiment, the infusion process includes packing the screen (152) of the stopper (140) with a product capable of burning and placing the packed screen (152) into the bowl-like opening (148) in the second end (146) of the third modified stopper (140). In one embodiment, during cooling, the fluid container pulls or draws a vacuum, thereby pulling or drawing a working fluid including air from the outside of the fluid container through the third modified stopper into the fluid container. In one embodiment, the invention includes lighting the product causing the product to burn and emit smoke during the cooling. Smoke from the product is pulled or drawn into the barrel much like the pulling or drawing of a pipe. The smoke drawn from the third modified stopper into the fluid container infuses smoke-like characteristics to the interior of the fluid container.

The third modified stopper (140) is configured into two separate components with a first component (154) including the first component first end (156) and a second component (158) including a second component second end (160) which is contiguous with the second end (146) of the stopper (140) described above. The modified third stopper includes a reversible seal mechanism (162). The reversible seal (162) is adapted to be closed in an air tight fashion when the second component (158) is not attached to the first component (154). The reversible seal (162) is adapted to be open and providing fluidic communication between the first compartment (154) and the second component (158) when the second component (158 is attached to the first component (154).

Construction Materials, and Methods of and Devices for the Preparation of Same

In other aspects, the invention features a construction material including wood reconditioned in accordance with the methods of the invention and methods and devices adapted for the preparation of the construction material.

In one embodiment, the wood being reconditioned in accordance with the methods of the invention includes a wooden barrel. A wooden barrel typically includes a barrel lid, a barrel bottom, and a circular body including a plurality of narrow strips otherwise known as staves which when placed vertically edge to edge form sides of the barrel. For the purposes of this application, the term "stave" refers to "an individual curved strip of wood which when placed vertically edge to edge to another stave is used to form the sides of a barrel.

Figure 8:
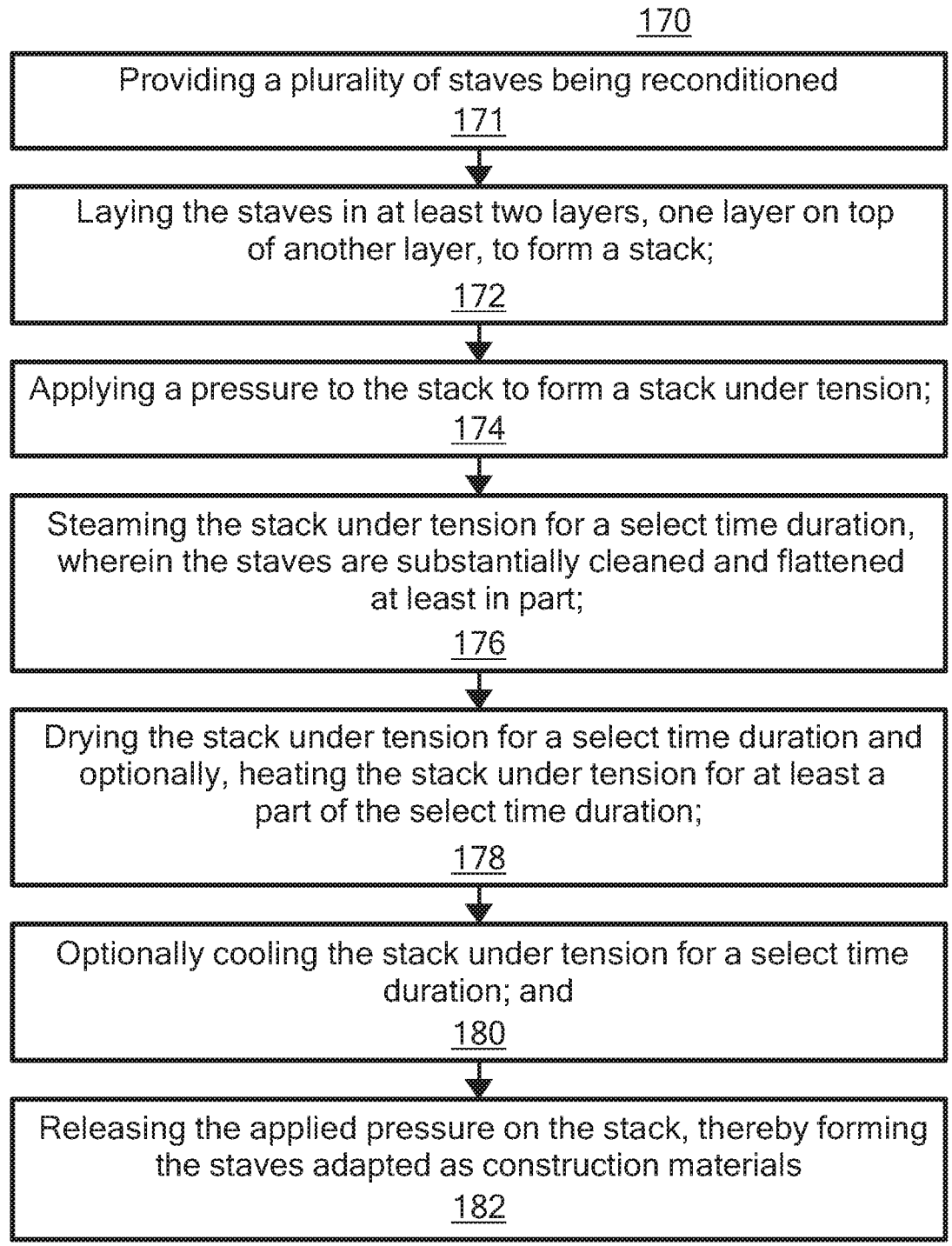
FIG. 8 is a flow chart of a method according to an embodiment of the present invention.

The method for preparing a construction material includes providing a plurality of staves (step 171); laying the staves in at least two layers, one layer on top of another layer, to form a stack (step 172); applying a pressure to the stack to form a stack under tension (step 174); steaming the stack under tension for a select time duration, wherein the staves are substantially cleaned and flattened at least in part (step 176); drying the stack under tension for a select time duration (step 178); and releasing the applied pressure on the stack, thereby forming the staves adapted as the construction material (step 182), as illustrated in FIG. 8. In a preferable embodiment, the providing step includes providing the staves being reconditioned in accordance with the methods of the invention. In another preferable embodiment, the drying step includes heating the stack under tension for at least part of the select time duration. In still another preferable embodiment, the method includes cooling the stack under a select time duration (Step 180).

Figure 9A:
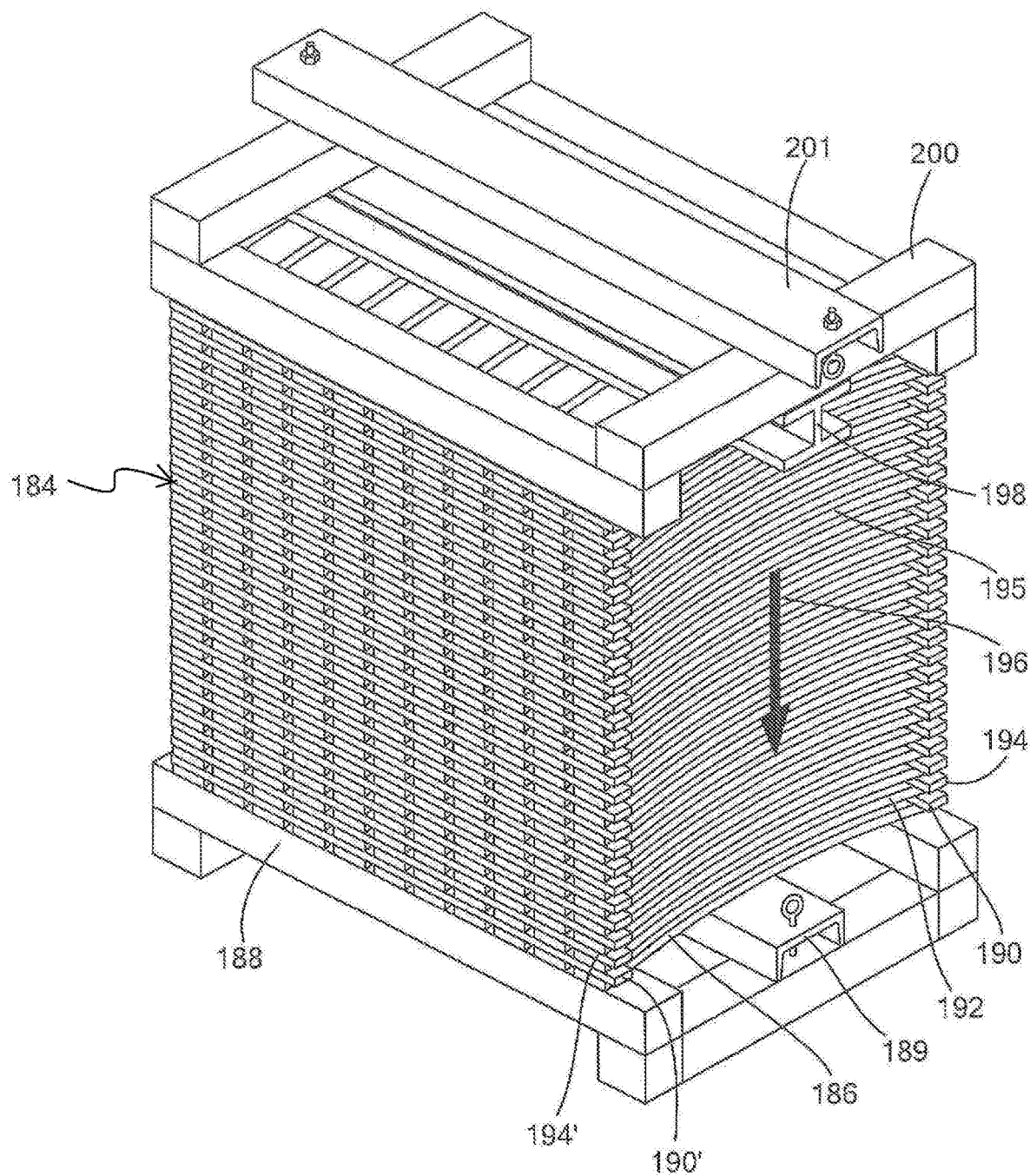
FIG. 9A is a view according to one embodiment of the present invention.

In one embodiment, the step of laying the staves in at least two layers includes laying the staves (184) in a first layer (186) on a base structure (188), laying at least two first separators (190, 190') on top of the first layer (186), laying a second layer (192) of the staves on top of the first separators (190, 190'), laying at least two second separators (194, 194') on top of the second layer (192) of staves, and laying consecutive layers of staves each separated by at least two separators until a desired height of the stack is reached, as shown in FIG. 9. In a preferred embodiment, the staves are laid in the stack having the curves (195) of the staves disposed in a downward orientation (196). Preferably, at least one weighting device (198) is laid on top of the top layer of staves. In embodiments of the invention, the weighting device (198) includes a metal beam, and preferably a steel beam. The step can further include laying a top structure (200) directly on top of the top layer of staves or on top of the weighting device. In a preferred embodiment, the base structure (188) includes a wood and/or metal components. In one embodiment, the base structure (188) is a rectangular or square pallet. In one embodiment, the base structure (188) is a frame of wooden and steel beams. The base structure (188) and the top structure (200) can be designed in a selected width and length to accommodate the layering of staves on top of the base structure and between the base structure and the top structure. In preferred embodiments, the base (188) and/or top (200) structures include a respective reinforcing device (189) and/or (201). The reinforcing device can be formed of materials known to those of ordinary skill in the art which will impart additional strength to the base and/or top structures. Preferably, at least one of the reinforcing devices (189) (201) include a metal beam. Preferably, at least one of the reinforcing devices is disposed along a center line in the middle of the width of the base and/or top structures.

Figure 9B:
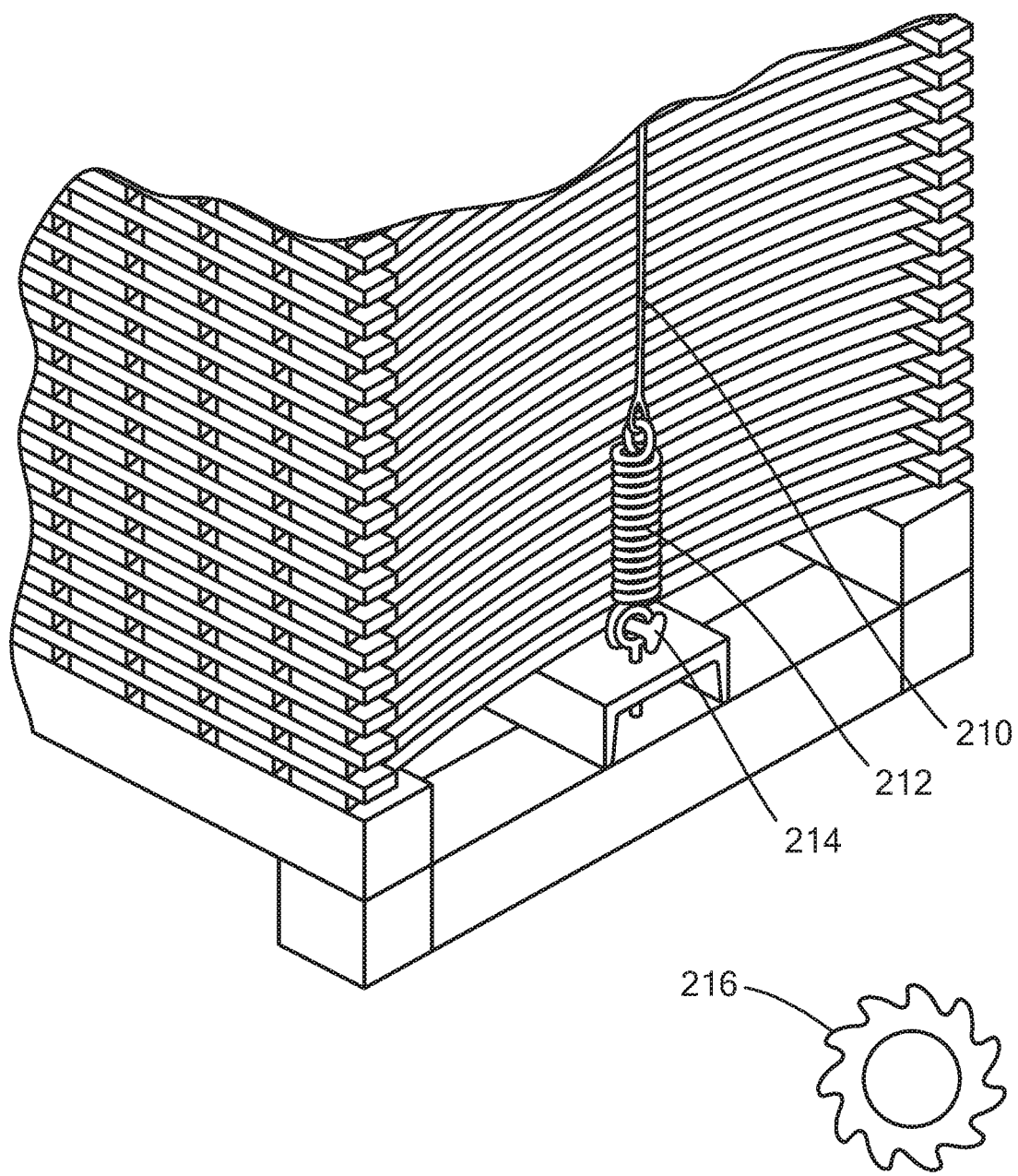
FIG. 9B is a view according to one embodiment of the present invention.

In another embodiment, the step of applying pressure to the stack to form a stack under tension includes reversibly connecting at least one tension device (210) from the base structure to the top structure. In one embodiment, the tension device (210) includes a spring (212), as shown in FIG. 9B. In another embodiment, at least one of the base structure and the top structure include a tension connecting device (214) for reversibly connecting the tension device to the respective base structure and/or top structure. In another preferred embodiment, at least a first tension device is used to connect reversibly a first end of the base structure to a corresponding first end of the top structure, and at least a second tension device is used to connect reversibly a second end of the base structure disposed on an opposite side of the base structure from the first end of the base structure, to a corresponding second end of the top structure disposed on an opposite side of the top structure from the first end of the top structure. In one embodiment, the step of applying pressure to the stack includes ratcheting the tension device with a ratcheting device (216) to increase the pressure on the stack.

In one embodiment, the method of preparing the construction material includes the preparation method (250) as shown in FIG. 12. Such a method can include cutting at least one stave having a first length and a first width and a first depth along the first length at a select depth thereby forming at least a first cut stave and a second cut stave each having the first length and the first width and a cut second depth, and an uncut first side and rough cut second side (step 252). The method can further include planing at least one rough cut second side to form a substantially smooth cut second side adapted for construction and having a select finished depth (step 254). Preferably the select finished depth is in a range of 0.25 inches to 1.0 inch, and more preferably, is ⅜ inch. In addition, the method can include trimming at least one edge of at least one stave thereby forming a trimmed edge (256). In one embodiment, the method includes providing a jig adapted for trimming the at least one edge of the at least one stave.

Figure 10:
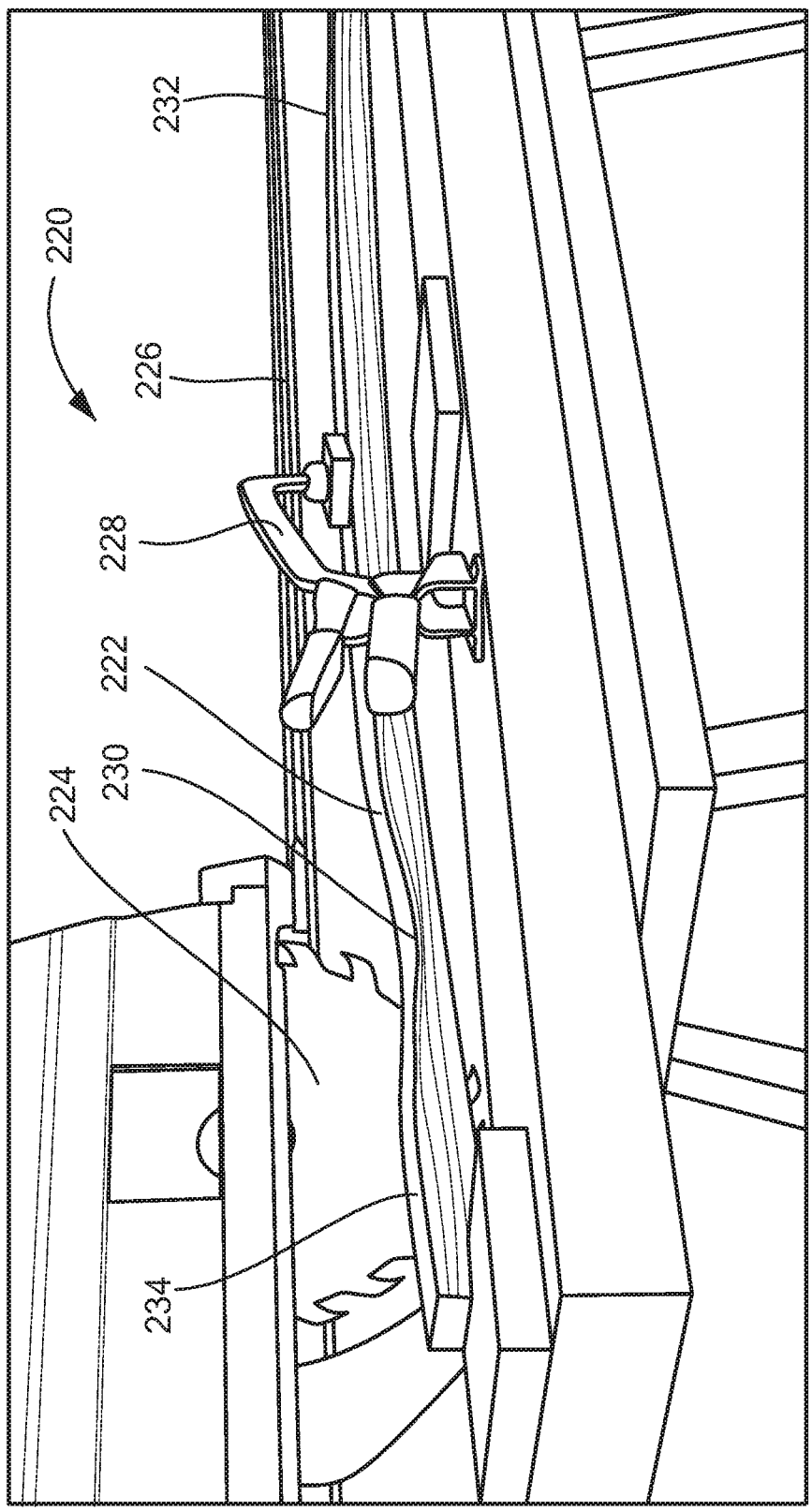
FIG. 10 is a view according to one embodiment of the present invention.

Accordingly, in one aspect, the invention features a jig (220) for trimming a piece of work (222), as shown in FIG. 10. The jig (220) includes a sliding plunge cut track saw (224) disposed to slide along a track (226) of a selected length, the track (226) being mounted at a height adapted to permit the plunging of the saw (224) into the piece of work (222) thereby cutting the piece of work (222); and a clamping device (228)) adapted to clamp and hold steady the piece of work (222) during the cutting thereof; wherein when the saw (224) is released and slides along the track (226), an edge (230) of the piece of work can be trimmed to a selected width thereby forming a trimmed edge (232). Preferably, the jig is adapted for processing a the piece of work (222) including a stave (234) reconditioned according to a method of the invention. Preferably, the jig (220) is adapted to trim a piece of work (222) in a width in a range of 1.0 to 3.0 inches. Preferably, the piece of work (222) includes a stave from a wooden barrel. The sliding plunge cut track saw (224) can include saws commercially available and known to those of ordinary skill in the art. A non-limiting exemplary saw includes a Festool brand sliding plungecut track saw.

In one embodiment, the method of preparing a construction material (250) can include substantially finely trimming at least one of the edge and the trimmed edge of at least one stave thereby forming a finely trimmed edge (step 258), as shown in of FIG. 12.

Figure 11:
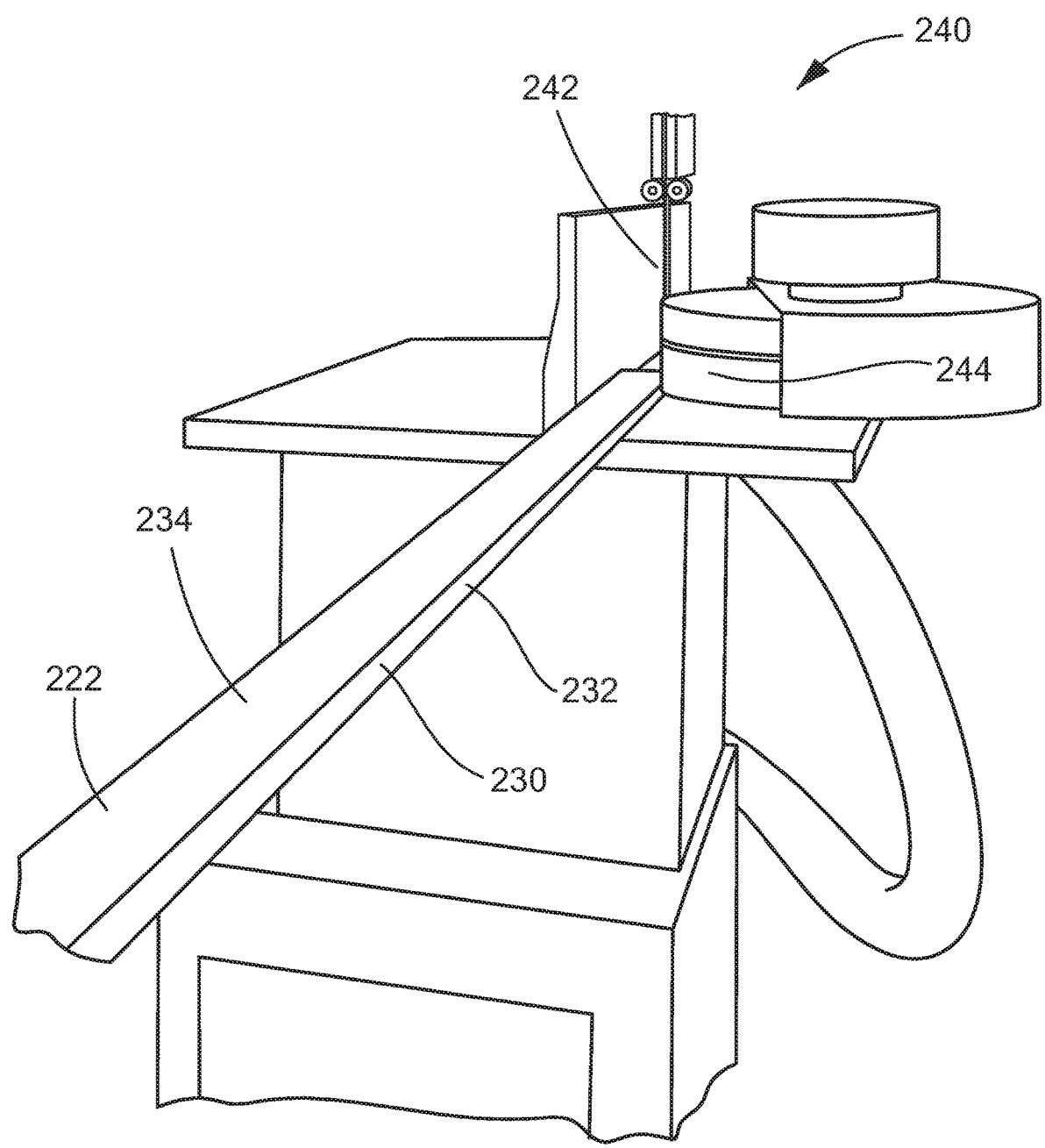
FIG. 11 is a view according to one embodiment of the present invention.

Accordingly, in one aspect, the invention provides a cutting device (240) adapted for substantially finely trimming the edge (230) or the trimmed edge (232) of at least one piece of work (222), wherein the preferably including a stave (234) reconditioned in accordance with a method of the invention, as shown in FIG. 11. The cutting device (240) includes a saw (242) and a power feed (244) adapted for receiving and feeding the piece of work (222) as the work is substantially finely trimmed.

In one embodiment, the method of preparing a construction material (250) can include planing at least one of an edge, a trimmed edge, and a finely trimmed edge of at least one stave (step 260), as shown in FIG. 12. The method can also include taping or banding a plurality of staves being at least one of cut, trimmed, and planed (step 262). The method can further include steaming a plurality of banded staves at a select temperature, a select pressure, and for a select time duration thereby flattening at least in part the staves (step 264.

In one embodiment, the further construction material preparation methods affixing at least one stave to a substrate. In one embodiment, the substrate includes subfloor, such as, for a non-limiting example, a plywood subfloor.

In one embodiment, the invention further includes shaving down at least one of an outer surface of a lid or a bottom of the fluid container and/or applying a distinguishing mark to the shaved down outer surface. Alternatively, the lids can be separated into individual staves and/or infused with an infusion agent, as described herein.

The invention is not to be limited to what has been particularly shown and described but is intended to encompass the spirit and true scope of the exemplary embodiments and the appended claims

The invention claimed is:

1. A method of reconditioning a fluid container comprising:
   heating for at least one cycle the fluid container to maintain a minimum temperature in an interior of a body of the fluid container for a select heating time duration;
   wherein the fluid container is heated by supplying a working fluid including a heating fluid into a sealable opening fluidically connected to the interior of the body of the fluid container;
   pressure sealing for at least one cycle in the interior of the body of the fluid container;
   wherein the fluid container comprises at least one of a pore, a cell, and a fiber;
   wherein the body consists of a first lid surface, a second bottom surface, and at least one side of the fluid container connecting the first lid surface to the second bottom surface thereby enclosing the interior of the fluid container;
   cooling for at least one cycle the fluid container to achieve a select cooling vacuum less than atmospheric pressure in the interior of the body of the fluid container when sealed for a select cooling time duration;
   wherein the select cooling vacuum and the select cooling time duration are selected to draw substantially a fluid from the at least one of a pore, a cell and a fiber of the fluid container to an interior surface of the body of the fluid container.

2. The method of claim 1, wherein the select cooling vacuum and the select cooling time duration of the cooling step are selected to vaporize the fluid drawn to the interior surface of the fluid container.

3. The method of claim 1, wherein the sealing step includes inserting a first end of a specialized stopper into an opening of the fluid container.

4. The method of claim 3, wherein the specialized stopper has a second end adapted for reversibly connecting to at least one of a pressure gauge; a temperature gauge; a device adapted for passing at least one of a working fluid and an infusion agent; a sealing device; and a screen mesh adapted for containing a product capable of burning.

5. The method of claim 1 further comprising:
   unsealing for at least one cycle the interior of the body of the fluid container; and
   removing and/or draining for at least one cycle fluid from the interior of the body of the fluid container.

6. The method of claim 1 further comprising:
   substantially drying for at least one cycle the fluid container with a working fluid including a drying fluid.

7. The method of claim 1 further comprising:
   pulling a working fluid including a remaining fluid from an interior of the fluid container thereby achieving a select withdrawal vacuum inside the interior of the body of the fluid container for a select withdrawal time duration.

8. The method of claim 1 further comprising:
   after the cooling step, withdrawing a working fluid from the interior of the body of the fluid container to achieve a select withdrawal vacuum less than atmospheric pressure in the interior of the body of the fluid container;
   wherein the working fluid includes air, moisture and possibly other fluids which remain in the fluid container;
   maintaining the interior of the body of the fluid container at the select withdrawal vacuum for a select maintaining withdrawal time duration; and
   infusing an infusion agent into the at least one of a pore, a cell and a fiber of the body of the fluid container.

9. The method of claim 8, wherein the infusion agent includes at least one of an alcohol component, a fruit component, a fruit concentrate component, a coffee component, a tea component, an herb component, a synthetic flavoring component, a natural flavoring component, and a combination of at least two of the aforementioned components.

10. The method of claim 8 further comprising:
    subsequent to addition of the infusion agent to the interior of the body of the fluid container, maintaining the interior of the body of the sealed fluid container for a select infusion time duration for infusing the infusion agent into the at least one of a pore, a cell and a fiber into the interior surface of the body of the fluid container.

11. The method of claim 1 further comprising:
    wherein the fluid container comprises a plurality of staves;
    laying the plurality of staves of the fluid container in at least a first layer and a second layer disposed above the first layer thereby forming a preliminary stack;
    applying a select pressure to the preliminary stack to form a stack under tension;
    steaming the stack under tension for select time duration thereby at least in part flattening the staves;
    heating the stack under tension for a select time duration; and
    cooling the stack under tension for a select time.

12. The method of claim 11, wherein the laying step includes laying the plurality of staves having at a curve of at least one stave facing downwards.

13. The method of claim 11 further comprising:
    laying the first layer on a base structure; and
    laying at least two first separators between the first layer and the second layer.

14. The method of claim 1 further comprising:
    wherein the fluid container comprises a plurality of staves;
    cutting at least one stave of the plurality of staves, the at least one stave having a first length, a first width and a first depth at a select depth thereby forming two cut staves each having the first length, the first width and the select depth, and having an uncut first side and a rough cut second side;

planing the rough cut second side of the at least one stave thereby forming a substantially smooth cut second side;

trimming at least one first edge of the at least one stave along the first length thereby forming a trimmed first edge of the at least one stave; and planing the trimmed first edge of the at least one stave thereby formed a substantially smooth first edge of the at least one stave.

15. The method of claim 14 further comprising:
affixing the at least one stave to a substrate.

16. The method of claim 1,
wherein the minimum temperature is 180° F.;
wherein the select heating time duration is in a range of one to ten minutes;
wherein the select cooling vacuum is in a range of 15 to 20 inches mercury in the interior of the body of the fluid container; and
the select cooling time duration is in a range of 1 to 20 minutes.

17. The method of claim 1,
infusing an infusion agent into at last one of a pore, a cell and a fiber of the fluid container.

18. A method of reconditioning a fluid container comprising:
sealing an interior of a body of the fluid container;
wherein the fluid container comprises at least one of a pore, a cell, and a fiber,
wherein the body consists of a first lid surface, a second bottom surface and at least one side of the fluid container connecting the first lid surface to the second bottom surface, thereby enclosing an interior of the body of the fluid container;
withdrawing a working fluid from the interior of the body of the fluid container to a select withdrawal vacuum less than atmospheric pressure in the interior of the body of the fluid container;
wherein the working fluid includes air, moisture and possibly other fluids which remain in the fluid container; and
subsequent to the withdrawing step, adding an infusion agent through a sealable opening fluidically connected to the interior of the body of the fluid container; and
subsequent to adding of the infusion agent to the interior of the body of the fluid container, maintaining the interior of the body of the sealed fluid container for a select infusion time duration for infusing the infusion agent into the at least one of a pore, a cell and a fiber into the interior surface of the body of the fluid container.

19. The method of claim 18, wherein the method further comprises:

subsequent to the withdrawing step, adding a pressurizing fluid to the interior of the body of the fluid container to a select infusion pressure.

20. The method of claim 18, further comprising:
maintaining the interior of the body of the fluid container at a minimum infusion temperature;
wherein the minimum infusion temperature is equal to a boiling temperature of the infusion agent.

21. The method of claim 18, further comprising:
prior to the steps of sealing, withdrawing and adding the infusion agent, providing the fluid container reconditioned according to the following steps:
heating for at least one cycle the fluid container to maintain a minimum heating temperature in the interior of the body of the fluid container for a select heating time duration;
wherein the fluid container is heated by supplying a working fluid including a heating fluid into the interior of the body of the fluid container;
after the step of heating, sealing for at least one cycle the interior of the body of the fluid container;
after the steps of heating and sealing, cooling for at least one cycle the fluid container to achieve a select cooling pressure less than atmospheric pressure in the interior of the body of the fluid container when sealed for a select cooling time duration;
wherein the select cooling pressure and the select cooling time duration are selected to draw substantially a fluid from the at least one of a pore, a cell and a fiber of the fluid container to a surface of the fluid container;
unsealing the fluid container; and
draining the fluid container.

22. The method of claim 18, wherein the infusion agent is added in a range of 0.375 liters to 1.5 liters per 200 liters of volume of the interior of the body of the fluid container.

23. The method of claim 22, wherein the infusion agent is the flavoring fluid including an ethanol-based liquid fit for human consumption.

24. The method of claim 18, wherein the infusion agent is selected from the group consisting of a flavoring fluid, a sanitizing fluid, a hydration fluid, and a combination of at least two of the aforementioned fluids.

25. The method of claim 18,
wherein the working fluid comprises air;
wherein maintaining the interior of the body of the sealed fluid container for the select infusion time duration comprises maintaining the interior of the body of the sealed fluid container at a select infusion pressure is in a range of 5 to 7 psi; and
wherein the select infusion time duration is in a range of 5 to 180 minutes.

* * * * *